US012771269B2

(12) United States Patent
Chang

(10) Patent No.: US 12,771,269 B2
(45) Date of Patent: Oct. 20, 2026

(54) MOTOR CONTROL APPARATUS AND VEHICLE HAVING THE SAME

(71) Applicants: HYUNDAI MOTOR COMPANY, Seoul (KR); KIA CORPORATION, Seoul (KR)

(72) Inventor: Kyoung-Jin Chang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 548 days.

(21) Appl. No.: 18/075,114

(22) Filed: Dec. 5, 2022

(65) Prior Publication Data

US 2023/0344374 A1 Oct. 26, 2023

(30) Foreign Application Priority Data

Apr. 20, 2022 (KR) ........................ 10-2022-0048968

(51) Int. Cl.

*H02P 1/26* (2006.01)
*H02M 7/5387* (2007.01)
*H02P 6/20* (2016.01)
*H02P 21/05* (2006.01)
*H02P 21/22* (2016.01)

(Continued)

(52) U.S. Cl.

CPC ........ *H02P 21/05* (2013.01); *H02M 7/53871* (2013.01); *H02P 21/22* (2016.02); *H02P 27/12* (2013.01); *B60K 1/00* (2013.01)

(58) Field of Classification Search

CPC .. H02P 1/26; H02P 21/00; H02P 21/02; H02P 21/10; H02P 21/34; H02P 2101/45; H02P 2103/20; H02P 2201/03; H02P 2205/07; H02P 23/30; H02P 25/02; H02P 25/024; H02P 27/04; H02P 27/14;

(Continued)

(56) References Cited

U.S. PATENT DOCUMENTS 9,577,565 B2 2/2017 Otsubo
10,235,987 B1 * 3/2019 Valeri .............. G10K 11/17823

(Continued)

FOREIGN PATENT DOCUMENTS

JP 2017163785 A 9/2017
JP 2018042413 A 3/2018

(Continued)

*Primary Examiner* — Kawing Chan
*Assistant Examiner* — Charles S Laughlin
(74) *Attorney, Agent, or Firm* — Lempia Summerfield Katz LLC

(57) ABSTRACT

Provided is a motor control apparatus for removing noise in a vehicle and a vehicle having the same. The vehicle generates a plurality of reference signals based on a velocity of a motor, filter the plurality of reference signals based on an error signal and a preset filter value, takes a sum of the filtered plurality of reference signals to obtain a target signal, generates a d-axis current command for reducing noise generated by the motor based on the target signal, generates a q-axis current command for controlling the velocity of the motor based on the velocity of the motor and a velocity command, generates a voltage command based on the d-axis current command of the motor and the q-axis current command of the motor, and outputs the generated voltage command to the inverter.

17 Claims, 12 Drawing Sheets

1

(51) Int. Cl.
*H02P 27/12* (2006.01)
*B60K 1/00* (2006.01)

(58) Field of Classification Search
CPC ...... H02P 29/02; H02P 29/024; H02P 29/027; H02P 29/60
See application file for complete search history.

(56) References Cited

U.S. PATENT DOCUMENTS

| | | | | |
|---|---|---|---|---|
| 11,017,760 | B1 | 5/2021 | Chang | |
| 2009/0146589 | A1 | 6/2009 | Hattori et al. | |
| 2014/0294189 | A1 | 10/2014 | Pan | |
| 2015/0228267 | A1* | 8/2015 | Inoue | G10K 11/17883 381/71.4 |
| 2016/0028335 | A1* | 1/2016 | Dixon | B62D 5/0463 318/432 |
| 2021/0134260 | A1 | 5/2021 | Chang | |

FOREIGN PATENT DOCUMENTS

| | | | |
|---|---|---|---|
| KR | 20080087547 | A | 10/2008 |
| KR | 20170091921 | A | 8/2017 |
| KR | 20210053098 | A | 5/2021 |

* cited by examiner

I : CURRENT
R : RESISTANCE
L : INDUCTANCE

MOTOR CONTROL APPARATUS AND VEHICLE HAVING THE SAME

CROSS-REFERENCE TO RELATED APPLICATION

This application is based on and claims priority under 35 U.S.C. § 119 to Korean Patent Application No. 10-2022-0048968, filed on Apr. 20, 2022, in the Korean Intellectual Property Office, the disclosure of which is incorporated herein by reference.

BACKGROUND

1. Field

The disclosure relates to a motor control apparatus for reducing noise in a vehicle and a vehicle having the same.

2. Description of the Related Art

A vehicle is a machine driven by wheels for transporting people or cargo and provided to move on a road. Such a vehicle includes an internal combustion engine vehicle (a general engine driven vehicle) that generates mechanical power by burning petroleum fuels, such as gasoline and light oil and travels using the mechanical power, and an eco-friendly vehicle that travels on electricity to enhance the fuel efficiency and reduce toxic gas emissions.

The eco-friendly vehicle includes: an electric vehicle equipped with a battery (i.e., a chargeable power unit) and a motor to rotate the motor with the electricity accumulated in the battery and drive wheels using the rotation of the motor; a hybrid vehicle equipped with an engine, a battery, and a motor to travel by controlling the mechanical power of the engine and the electric power of the motor; and a hydrogen fuel cell vehicle.

Such an eco-friendly vehicle has a limitation that noise occurs due to driving of a motor.

Conventionally, in order to remove noise generated from a motor of a vehicle, a motor provided on a steering wheel is used.

Related art includes a radiation sound generating device and generates vibration from a motor provided in a steering wheel, which is not a motor connected to wheels (i.e., a noise generating source) to reduce noise. The related art has a limitation in that due to the influence of disturbance, performance control is lowered, and thus noise reduction performance is lowered.

In addition, in the related art, a special algorithm is needed to reduce noise of the motor of the wheel, which includes various overtones, using vibration of the motor of the steering wheel.

The statements in this BACKGROUND section merely provide background information related to the present disclosure and may not constitute prior art.

SUMMARY

The present disclosure may provide a motor control apparatus capable of performing torque control on a motor connected to wheels while removing noise generated from the motor, and a vehicle having the same.

The technical objectives of the disclosure are not limited to the above. Other objectives may become apparent to those of ordinary skill in the art based on the following descriptions.

According to an aspect of the disclosure, a motor control apparatus includes: an error sensor configured to detect noise and output the detected noise as an error signal; a velocity sensor configured to detect a velocity of a motor that drives wheels; and a current controller. The current controller is configured to: generate a reference signal based on the velocity of the motor detected by the velocity sensor; filter the reference signal based on the error signal and a preset filter value; and generate a d-axis current command for reducing noise generated by the motor based on the filtered reference signal.

The motor control apparatus may further include a velocity controller configured to generate a q-axis current command for controlling the velocity of the motor based on the velocity of the motor detected by the velocity sensor and a velocity command, wherein the current controller may be configured to generate a voltage command based on the d-axis current command and the q-axis current command and output the generated voltage command to an inverter.

The motor control apparatus may further include: a position sensor configured to detect a position of a rotor of the motor; and a position controller configured to generate the velocity command for performing position control on the rotor of the motor based on the position of the rotor detected by the position sensor and a position command.

The current controller may include: a basic signal generator configured to generate the reference signal; an active noise canceller configured to filter the reference signal based on the error signal and the preset filter value and generate the d-axis current command based on the filtered reference signal; and a magnetic flux reference controller configured to perform phase-conversion on the d-axis current command and the q-axis current command and perform a pulse-width modulation on a signal obtained by the phase-conversion, to generate a three-phase voltage command.

The reference signal may be a reference sine wave signal in a form of a sine wave, the active noise canceller may include: a first filter updater configured to filter the reference sine wave signal based on the error signal and a preset first filter value; a phase converter configured to convert a phase of the reference sine wave signal to generate a reference cosine wave signal; a second filter updater configured to filter the reference cosine wave signal based on the error signal and a preset second filter value; and a summation generator configured to take a sum of the filtered reference sine wave signal and the filtered reference cosine wave signal.

The active noise canceller may include: a first secondary path model configured to filter the reference sine wave signal using a secondary path model; a second secondary path model configured to filter the reference cosine wave signal using the secondary path model; and a least mean square (LMS) controller configured to update the first filter value of the first filter updater based on a signal obtained by filtering the reference sine wave signal in the first secondary path model and the error signal, and update the second filter value of the second filter updater based on a signal obtained by filtering the reference cosine wave signal in the second secondary path model and the error signal.

The magnetic flux reference controller may include: a proportional integral controller configured to perform proportional integration on the d-axis current command and perform proportional integration on the q-axis current command; a first phase converter configured to convert the d-axis current command and the q-axis current command, which are subjected to proportional integration by the proportional integral controller, to have three phases; a pulse-width modulation controller configured to modulate a pulse-width of a signal, which is converted to have three phases by the first phase converter, to generate the voltage command; and a second phase converter configured to convert a three-phase current of the motor detected by the current sensor into a two-phase current and provide the proportional integral controller with the two-phase current as feedback.

The motor control apparatus may further include a converter configured to convert the error signal output from the error sensor into a digital signal, wherein the error sensor may include a microphone or an acceleration sensor provided adjacent to the motor, and noise detected by the error sensor may be noise corresponding to a difference between original noise generated by the motor and noise generated by the motor that vibrates according to the d-axis current command.

According to an aspect of the disclosure, there is provided a motor control apparatus including: an error sensor configured to detect noise and output the detected noise as an error signal; a velocity sensor configured to detect a velocity of a motor; and a current controller configured to generate a plurality of reference signals based on the velocity of the motor detected by the velocity sensor, filter the plurality of reference signals based on the error signal and a preset filter value, take a sum of the filtered plurality of reference signals to obtain a target signal, and generate a d-axis current command for reducing noise generated by the motor based on the target signal.

The plurality of reference signals may include at least one fundamental frequency having a fundamental component and a multiple frequency having a multiple component of the at least one fundamental frequency, and the plurality of reference signals may be reference sine wave signals in a form of a sine wave.

The motor control apparatus may further include a velocity controller configured to generate a q-axis current command for controlling the velocity of the motor based on the velocity of the motor detected by the velocity sensor and a velocity command, wherein the current controller may be configured to generate a voltage command based on the d-axis current command and the q-axis current command and output the generated voltage command to an inverter.

The current controller may include: a basic signal generator configured to generate the plurality of reference signals; an active noise canceller configured to filter each of the plurality of reference signals based on the error signal and the preset filter value, take a sum of the filtered reference signals to generate the target signal, and generate the d-axis current command based on the target signal; and a magnetic flux reference controller configured to perform phase-conversion on the d-axis current command and the q-axis current command and perform a pulse-width modulation on a signal obtained by the phase-conversion, to generate a three-phase voltage command.

The active noise canceller may include a plurality of filtered-x least mean squared (FxLMS) operators configured to filter the plurality of reference signals, respectively, and a signal summation generator configured to take a sum of the reference signals filtered by the plurality of FxLMS operators.

The preset filter value may include a preset first filter value and a preset second filter value, and each of the plurality of FxLMS operators may include: a first filter updater configured to filter the reference sine wave signal based on the error signal and the preset first filter value; a phase converter configured to convert a phase of the reference sine wave signal to generate a reference cosine wave signal; a second filter updater configured to filter the reference cosine wave signal based on the error signal and the preset second filter value; and a summation generator configured to take a sum of the filtered reference sine wave signal and the filtered reference cosine wave signal.

Each of the plurality of FxLMS operators may include: a first secondary path model configured to filter the reference sine wave signal using a secondary path model; a second secondary path model configured to filter the reference cosine wave signal using the secondary path model; and a least mean square (LMS) controller configured to update the first filter value of the first filter updater based on a signal obtained by filtering the reference sine wave signal in the first secondary path model and the error signal, and update the second filter value of the second filter updater based on a signal obtained by filtering the reference cosine wave signal in the second secondary path model and the error signal.

The magnetic flux reference controller may include: a proportional integral controller configured to perform proportional integration on the d-axis current command and perform proportional integration on the q-axis current command; a first phase converter configured to convert the d-axis current command and the q-axis current command, which are subjected to proportional integration by the proportional integral controller, to have three phases; a pulse-width modulation controller configured to modulate a pulse-width of a signal, which is converted to have three phases by the first phase converter, to generate the voltage command; and a second phase converter configured to convert a three-phase current of the motor detected by the current sensor into a two-phase current and provide the proportional integral controller with the two-phase current as feedback.

According to an aspect of the disclosure, a vehicle includes: a drive shaft connected to wheels; a motor connected to the drive shaft; an inverter configured to adjust a voltage applied to the motor; an error sensor configured to detect noise of an indoor space and output the detected noise as an error signal; a velocity sensor configured to detect a velocity of the motor; and a motor control apparatus configured to generate a plurality of reference signals based on the velocity of the motor detected by the velocity sensor. The motor control apparatus is further configured to: filter the plurality of reference signals based on the error signal and a preset filter value, take a sum of the filtered plurality of reference signals to obtain a target signal, generate a d-axis current command for reducing noise generated by the motor based on the target signal, generate a q-axis current command for controlling the velocity of the motor based on the velocity of the motor detected by the velocity sensor and a velocity command, generate a voltage command based on the d-axis current command of the motor and the q-axis current command of the motor, and output the generated voltage command to the inverter. The vehicle further includes a body configured to, upon receiving vibration generated by the motor, transfer the received vibration to the indoor space in a form of radiation sound.

The motor control apparatus may include: a basic signal generator configured to generate the plurality of reference signals; an active noise canceller configured to filter each of the plurality of reference signals based on the error signal and the preset filter value, take a sum of the filtered reference signals to generate the target signal, and generate the d-axis current command based on the target signal; and a magnetic flux reference controller configured to perform phase-conversion on the d-axis current command and the q-axis current command and perform a pulse-width modulation on a signal obtained by the phase-conversion, to generate a three-phase voltage command.

The preset filter value may include a preset first filter value and a preset second filter value. The motor control apparatus may include: a first filter updater configured to filter the reference sine wave signal based on the error signal and the preset first filter value; a phase converter configured to convert a phase of the reference sine wave signal to generate a reference cosine wave signal; a second filter updater configured to filter the reference cosine wave signal based on the error signal and the preset second filter value; a summation generator configured to take a sum of the filtered reference sine wave signal and the filtered reference cosine wave signal; a first secondary path model configured to filter the reference sine wave signal using a secondary path model; a second secondary path model configured to filter the reference cosine wave signal using the secondary path model; and a least mean square (LMS) controller configured to update the first filter value of the first filter updater based on a signal obtained by filtering the reference sine wave signal in the first secondary path model and the error signal, and update the second filter value of the second filter updater based on a signal obtained by filtering the reference cosine wave signal in the second secondary path model and the error signal.

The motor control apparatus may include: a proportional integral controller configured to perform proportional integration on the d-axis current command and perform proportional integration on the q-axis current command; a first phase converter configured to convert the d-axis current command and the q-axis current command, which are subjected to proportional integration by the proportional integral controller, to have three phases; a pulse-width modulation controller configured to modulate a pulse-width of a signal, which is converted to have three phases by the first phase converter, to generate the voltage command; and a second phase converter configured to convert a three-phase current of the motor detected by the current sensor into a two-phase current and provide the proportional integral controller with the two-phase current as feedback.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
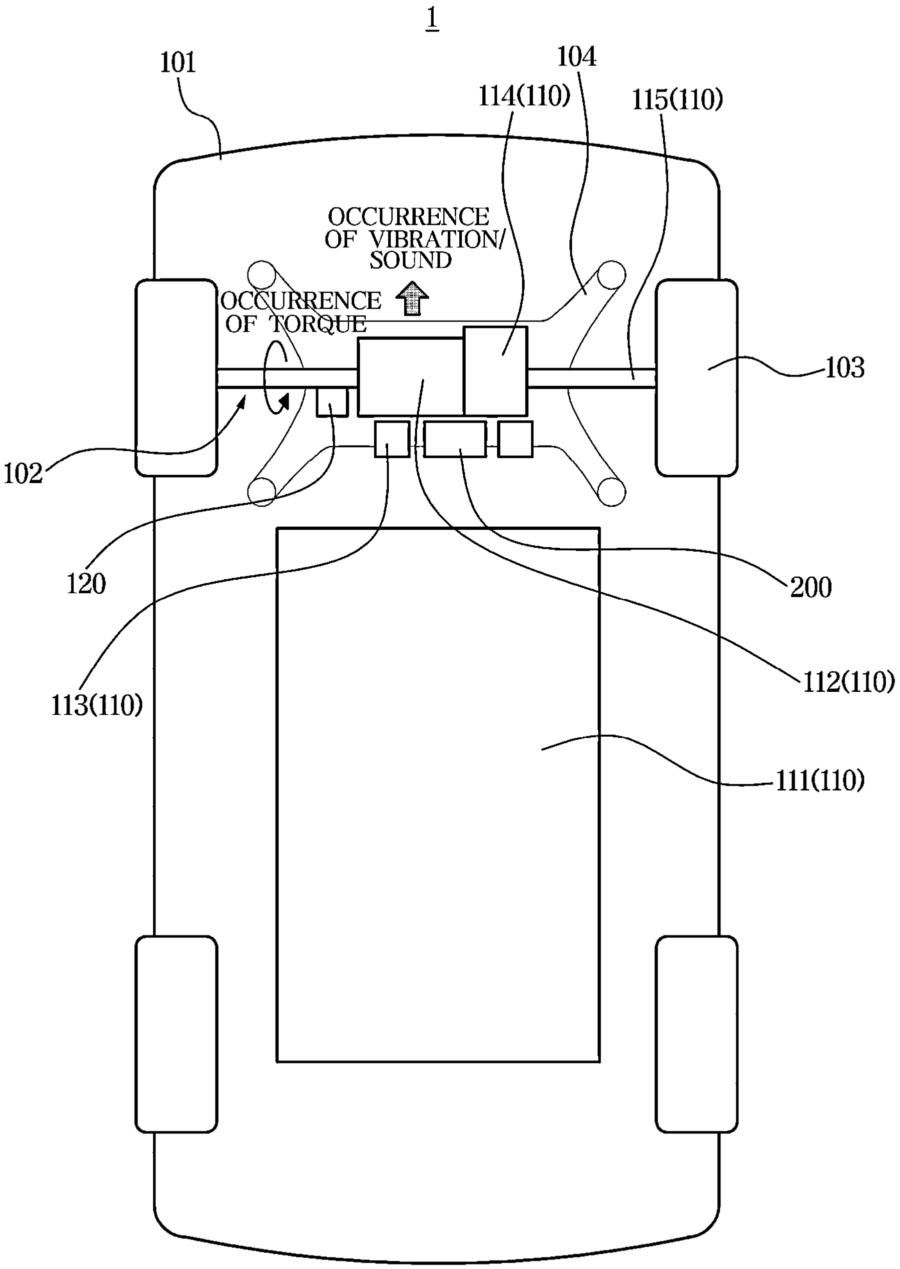
FIG. 1 is a diagram illustrating an example of a vehicle according to an embodiment.

Like numerals refer to like elements throughout the specification. Not all elements of embodiments of the present disclosure are described, and description of what are commonly known in the art or what overlap each other in the embodiments is omitted. The terms as used throughout the specification, such as "part," "module," "member," "block," and the like, may be implemented in software and/or hardware, and a plurality of "parts," "modules," "members," or "blocks" may be implemented in a single element, or a single "part," "module," "member," or "block" may include a plurality of elements.

It should be further understood that the term "connect" or its derivatives refer both to direct and indirect connection, and the indirect connection includes a connection over a wireless communication network. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," and the like, may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure are described with reference to the accompanying drawings.

FIG. 1 is a diagram illustrating an example of a vehicle according to an embodiment. The vehicle are described in conjunction with FIGS. 2 and 3.

Figure 2:
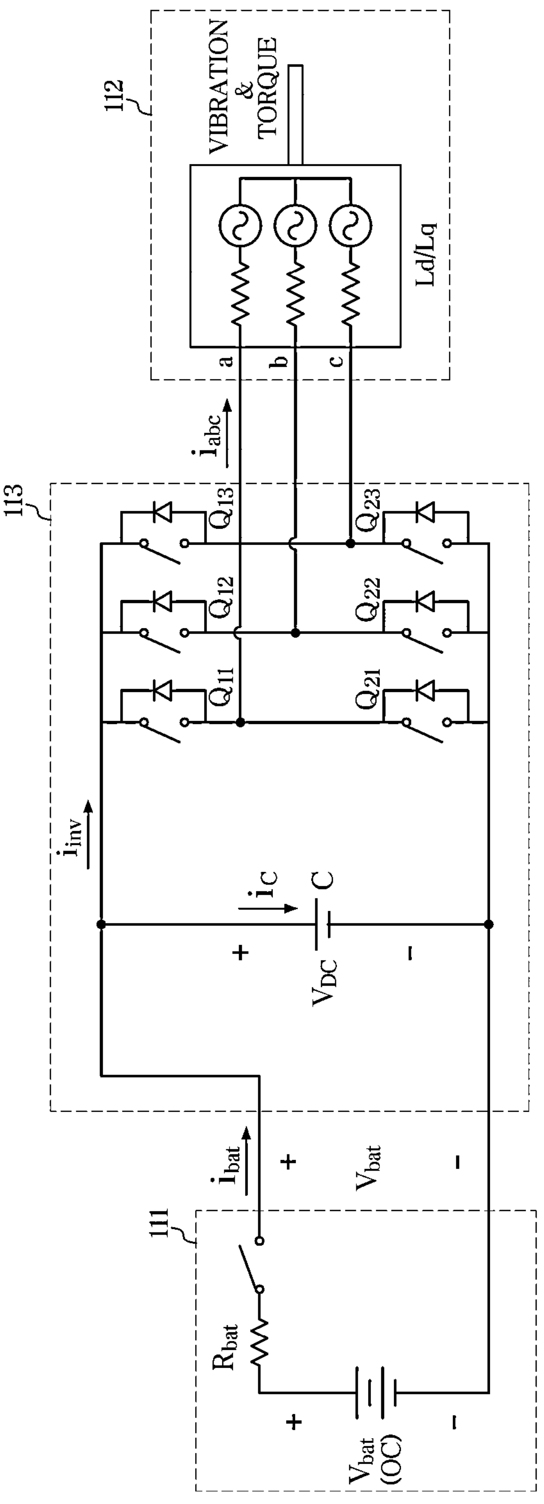
FIG. 2 is a diagram illustrating a flow of an electric current between a battery, an inverter, and a motor provided in a vehicle according to an embodiment.
Figure 3:
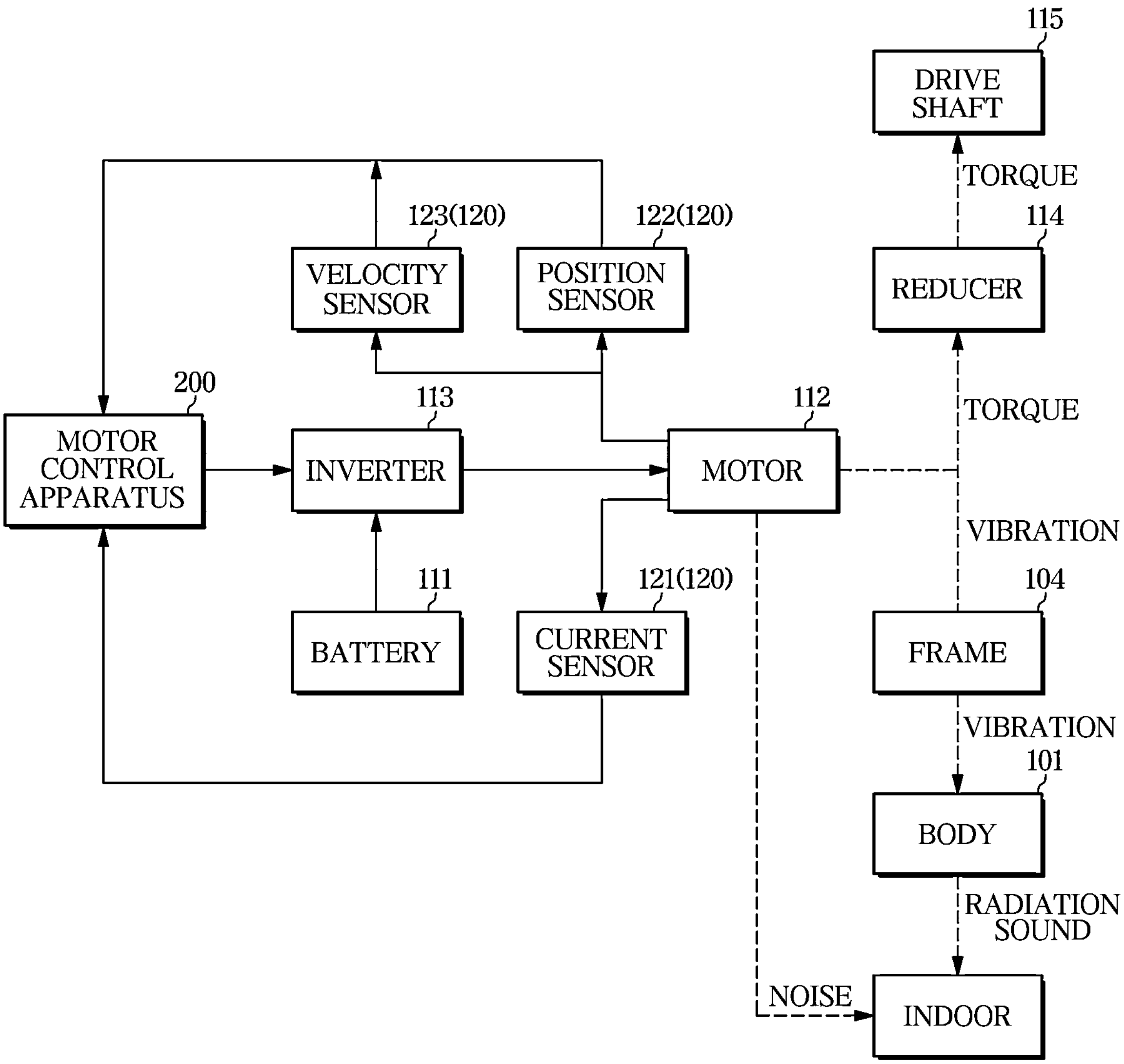
FIG. 3 is a block diagram illustrating a vehicle according to an embodiment.

FIG. 2 is a diagram illustrating a flow of an electric current between a battery, an inverter, and a motor provided in a vehicle according to an embodiment, and FIG. 3 is a block diagram illustrating a vehicle according to an embodiment.

A vehicle 1, according to an embodiment, is an eco-friendly vehicle, and may be a hybrid vehicle, an electric vehicle, or a hydrogen vehicle. In the present embodiment, an electric vehicle is described as an example of the vehicle 1.

The vehicle 1 includes a body 101 having an interior and an exterior, and a chassis 102 which is a part of the vehicle 1 except for the body, in which mechanical devices required for traveling are installed.

The exterior of the body 101 includes a front panel, a bonnet, a roof panel, a rear panel, front, rear, left, and right-side doors, and window glasses provided on the front, rear, left, and right-side doors to openable and closable.

The interior of the body 101 includes a seat on which an occupant sits, a dashboard, a center fascia in which a vent and a control panel of an air conditioner are disposed, a head unit provided on the center fascia and configured to receive operation commands of the audio device and the air conditioner.

Vibration generated by a motor 112 may be transmitted to the body 101. Radiation sound may be generated from the body 101, and in this case, the radiation sound may be transmitted back to the interior of the vehicle.

The chassis 102 of the vehicle 1 is a frame that supports the body 101, and the chassis 102 may include wheels 103 disposed on the front, rear, left, and right sides of the vehicle 1.

The chassis 102 of the vehicle 1 may include a power device 10 for applying a driving force to the wheels 103 of the vehicle, a steering device, a braking device for applying a braking force to the wheels 103 of the vehicle, and a suspension device.

The wheels, to which the power of the power device 110 and the braking force of the braking device are applied, may be left and right front wheels, or left and right rear wheels, and may be front, rear, left, and right wheels.

The power device 110 is a device that generates a driving force required for travelling of a vehicle and adjusts the generated driving force and may include a power generating device and a power transmitting device.

As shown in FIG. 1, the power device 110 of the vehicle 1 includes a battery 111, a motor 112, an inverter 113, a reducer 114, and a drive shaft 115.

The battery 111 may include a plurality of battery cells that generate a current at a high voltage and supply the vehicle 1 with driving power.

The vehicle may further include a fan (not shown) for lowering the temperature of the battery 111.

The battery 111 may include a plurality of battery packs.

Each of the battery packs may include a plurality of battery racks connected in series and parallel, and each of the battery racks may include a plurality of battery modules connected in series and parallel. In addition, in the case of a vehicle, rack-unit batteries may not be considered. Each of the battery packs may include a plurality of battery modules connected in series and in parallel.

Each of the battery modules may include a plurality of battery cells connected in series and in parallel.

A battery cell refers to a basic unit of a battery capable of charging and discharging electrical energy. For example, the battery cell may include: an anode; a cathode; a separator; an electrolyte; and an aluminum case.

Electrical reactions in an anode, a cathode, a separator, and an electrolyte of a battery cell are expressed by Ohm resistance, capacitance, and inductance, and chemical (oxidation-reduction) reactions are expressed by impedance that interferes with electrical transmission.

As shown in FIG. 2, a switch for supplying or cutting off power of the battery 111 may be connected to the battery 111.

The motor 112 may be provided on a frame 104. The frame 104 may be connected to the body 101.

The frame 104 corresponds to a path through which a vibration generated in the motor 112 is transmitted. The vibration generated from the frame 104 may be transmitted to the body 101.

The motor 112 is a driving motor that allows the vehicle to travel.

The motor 112 may include a permanent magnet synchronous motor (PMSM) capable of high magnetic flux and precise control.

The motor 112 converts electric energy of the battery 111 into energy for operating various devices provided in the vehicle.

The motor 112, when a booting button is turned on, is supplied with a maximum current to generate a maximum torque. The motor 112 may operate as a generator under energy regeneration conditions by braking, deceleration, downhill traveling, or low-speed traveling so that the battery 111 is charged.

The motor 112 generates a rotational force using the electric energy of the battery 111 and transmits the generated rotational force to the wheels 103 to drive the wheels 103.

As shown in FIG. 2, the motor 112 may be a motor having a three-phase inductance.

Figure 4:
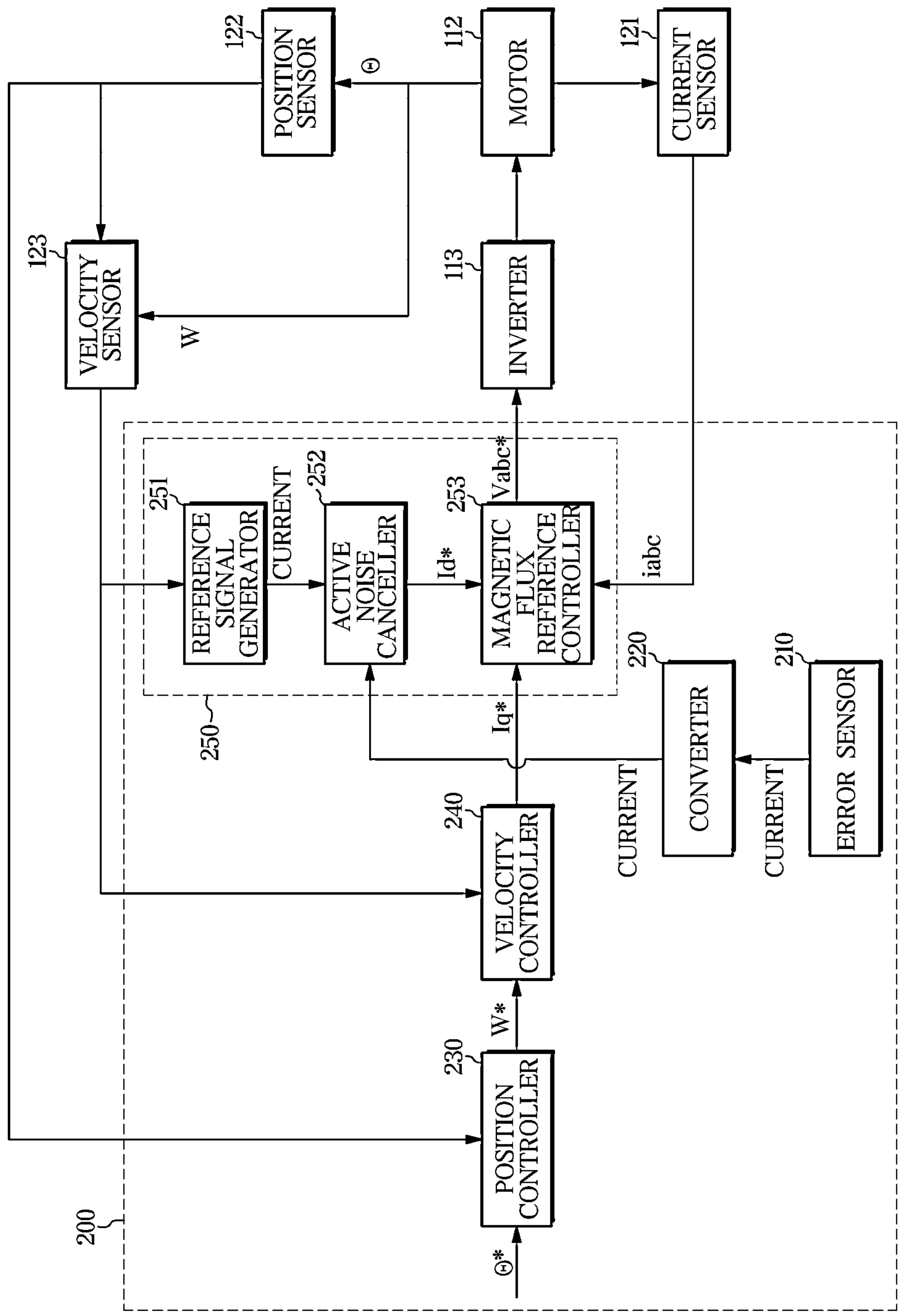
FIG. 4 is a control block diagram illustrating a motor control apparatus provided in a vehicle according to an embodiment.

In addition, when the vehicle is provided with a motor having different types of phases, the phase of the motor may be adjusted through a phase conversion in a current controller (see FIG. 4).

The motor 112 may generate torque for driving the wheel and may generate vibration for noise removal during operation.

The inverter 113 drives the motor 112 in response to a control command from a motor control apparatus 200. The inverter 113 controls the flow of a current based on a voltage command output from the motor control apparatus. The inverter 113 converts power of the battery 111 into driving power of the motor 112.

The inverter 113, when outputting the driving power of the motor 112, outputs the driving power of the motor 112 based on a target driving velocity according to a user command. The driving power of the motor 112 may vary according to a switching signal for outputting a current corresponding to the target driving velocity and a switching signal for outputting a voltage corresponding to the target driving velocity.

As shown in FIG. 2, the inverter 113 may include a plurality of switching elements and may further include a capacitor C.

The capacitor C smooths supplied power to lower pulsating current of the current of the power of the battery and convert the power into direct current (DC) power having a predetermined magnitude and transfer the DC power to the plurality of switching elements.

The plurality of switching elements converts the DC power delivered from the capacitor C into three-phase alternating current (AC) power. The plurality of switching elements is individually driven according to a control command of the motor control apparatus 200 to modulate a width of a pulse transmitted to the motor 112.

Two switching elements are connected to each of the three phases of the motor so that one of the two switch elements for each phase is referred to as an upper switching element and the other is referred to as a lower switching element.

Depending on whether the upper switching element is turned on or the lower switching element is turned on, the direction of the current may be changed. In addition, the upper switching element and the lower switching element for the same phase are not simultaneously turned on.

More specifically, the plurality of switching elements may include three upper switching elements $Q_{11}$-$Q_{13}$ and three lower switching elements $Q_{21}$-$Q_{23}$.

The three upper switching elements $Q_{11}$-$Q_{13}$ may be connected in series to the three lower switching elements $Q_{21}$-$Q_{23}$, respectively. A first upper switching element $Q_{11}$ may be connected in series to a first lower switching element $Q_{21}$ on terminal a, and a second upper switching element $Q_{12}$ may be connected in series with a second lower switching element $Q_{22}$ on terminal b, and a third upper switching element $Q_{13}$ may be connected in series to a third lower switching element $Q_{23}$ on terminal c. In addition, diodes may be connected in parallel to the terminal a, the terminal b, and the terminal c.

In addition, three nodes to which the three upper switching elements $Q_{11}$-$Q_{13}$ and the three lower switching elements $Q_{21}$-$Q_{23}$ are respectively connected to three input terminals a, b, and c of the motor 100. Accordingly, current may be supplied to the motor 112 through the three input terminals a, b, and c.

According to control of the opening and closing, on/off control of the upper switching elements $Q_{11}$-$Q_{13}$ and the lower switching elements $Q_{21}$-$Q_{23}$, the current applied to the motor 112 may be adjusted.

The inverter 113 may transmit power generated from the motor 112 to the battery 111 during regenerative braking. The inverter 113 may also perform a function of changing the direction and output of the current between the motor 112 and the battery 111.

The reducer 114 transmits, to the drive shaft 115, a rotational force obtained by decelerating the velocity of the motor 112 and increasing the torque of the motor 112. Wheels may be connected to the drive shaft 115.

The reducer 114 may include a reduction gear device for lowering the revolutions per minute (RPM) of the motor 112 to obtain a high driving force. The reducer 114 corresponds to a path through which the driving force generated by the motor 112 is transmitted.

The driver shaft 115 is a shaft connecting the reducer 114 and the wheels, and transmits a torque generated by the motor 112 to the wheels for the vehicle to travel.

The vehicle 1 may further include: a charger (not shown) provided on the exterior of the body, connected with a charging cable, and receiving power for charging the battery 111; and a power converter for converting power supplied from outside into power for charging the battery 111 and supplying the converted to the battery 111. The power supplied from outside may be power from a charging station or a power grid.

The charger may include a fast charger for rapidly charging the battery 111 and a slow charger for charging the battery 111 at a rate that is lower than that of the fast charging.

The fast charger may be connected with a cable for fast charging, and the slow charger 500 may be connected with a cable for slow charging.

In addition, the fast charger for fast charging and the slow charger for slow charging, of which the charging rate is lower than that of fast charging, may be provided at the same position on the exterior of the vehicle 1 or may be provided at different positions on the exterior of the vehicle 1.

The slow charger converts the external commercial power (AC power) into rectified and direct current, which is then transmitted to the battery. For example, the slow charger may include an AC rectifier, a power factor correction (PFC), a converter, and a capacitor.

The fast charger may include at least one of a terminal and a cable for directly connecting an external fast charger to the battery.

As shown in FIG. 3, the vehicle 1 may further include a plurality of sensors 120 and a motor control apparatus 200 for controlling the motor. In addition, a solid line shown in FIG. 3 indicates an electrical signal, and a dotted line indicates a non-electrical signal.

The plurality of sensors 120 include a current sensor 121 for detecting a current applied to the motor 112 and transmitting current information corresponding to the detected current to the motor control apparatus 200, and a position sensor 122 for detecting the position of a rotor of the motor 112 and transmitting position information about the detected position of the rotor to the motor control apparatus 200.

The current sensor 121 may detect the current of each of the three phases of the motor, that is, phase a, phase b, and phase c.

The position sensor 122 may include at least one of a resolver, an encoder, and a hall sensor.

The plurality of sensors 120 may further include a velocity sensor 123 for detecting the RPM of the motor 112 based on the position of the rotor detected by the position sensor 122 and transmitting velocity information about the detected RPM to the motor control apparatus 200.

The position sensor in the vehicle is omitted. The vehicle may include a position estimator for detecting the position of the rotor based on a current detected by the current sensor 121 and a voltage command.

The velocity sensor in the vehicle may be omitted. The vehicle may include a differentiator (not shown) for obtaining velocity information by differentiating the position of the rotor detected by the position sensor 122.

The motor control apparatus 200 may control the motor 112 to output a torque corresponding to a target traveling velocity and may control generation of vibration for removing noise of the motor 112.

The motor control apparatus 200 may, upon determining that the vehicle is started, or the vehicle is travelling, perform control for noise removal and noise reduction.

The motor control apparatus 200 may perform an active noise control (ANC) function.

The motor control apparatus 200 may include an electric power control unit (EPCU), as a circuit in which driving control and active noise control of a vehicle are simultaneously performed.

The motor control apparatus 200 may include a circuit for controlling the position, velocity, and torque of the motor of the vehicle, and a parallel multiple active noise control circuit that serves to generate vibration and sound to cancel noise of the motor.

A noise removal configuration of a vehicle using the motor control apparatus 200 is described in brief.

As shown in FIG. 3, under the control of the motor control apparatus 200, torque generated in the motor 112 may be transmitted to the drive shaft 115 through the reducer 114, and vibration generated in the motor 112 may be transferred to the body 101 through the frame 104.

The vibration transmitted to the body 101 may be changed to radiation sound, and the changed radiation sound may be transferred to the interior of the vehicle.

Original noise of the motor 112 may be transmitted to the interior of the vehicle, and the original noise of the motor 112 transmitted to the interior may be removed by the radiation sound transferred to the interior of the vehicle.

The motor control apparatus 200 is described with reference to FIGS. 4-8.

FIG. 4 is a control block diagram illustrating a motor control apparatus provided in a vehicle according to an embodiment, and the motor control apparatus is described in conjunction with FIGS. 5-9.

Figure 5:
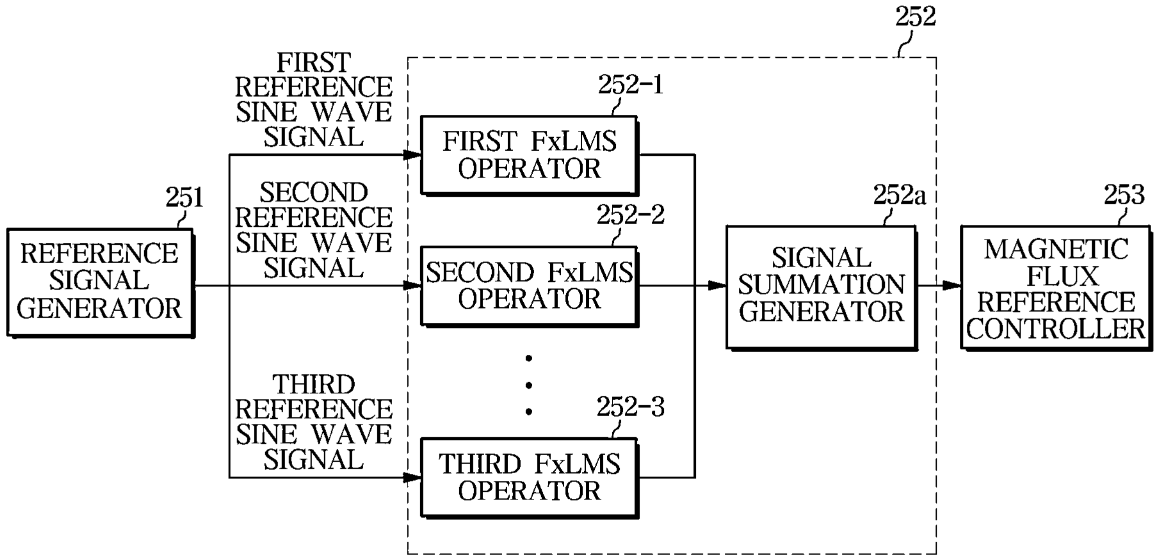
FIG. 5 is a detailed block diagram illustrating an active noise canceller of a motor control apparatus provided in a vehicle according to an embodiment.

FIG. 5 is a detailed block diagram illustrating an active noise canceller of a motor control apparatus provided in a vehicle according to an embodiment.

Figure 6:
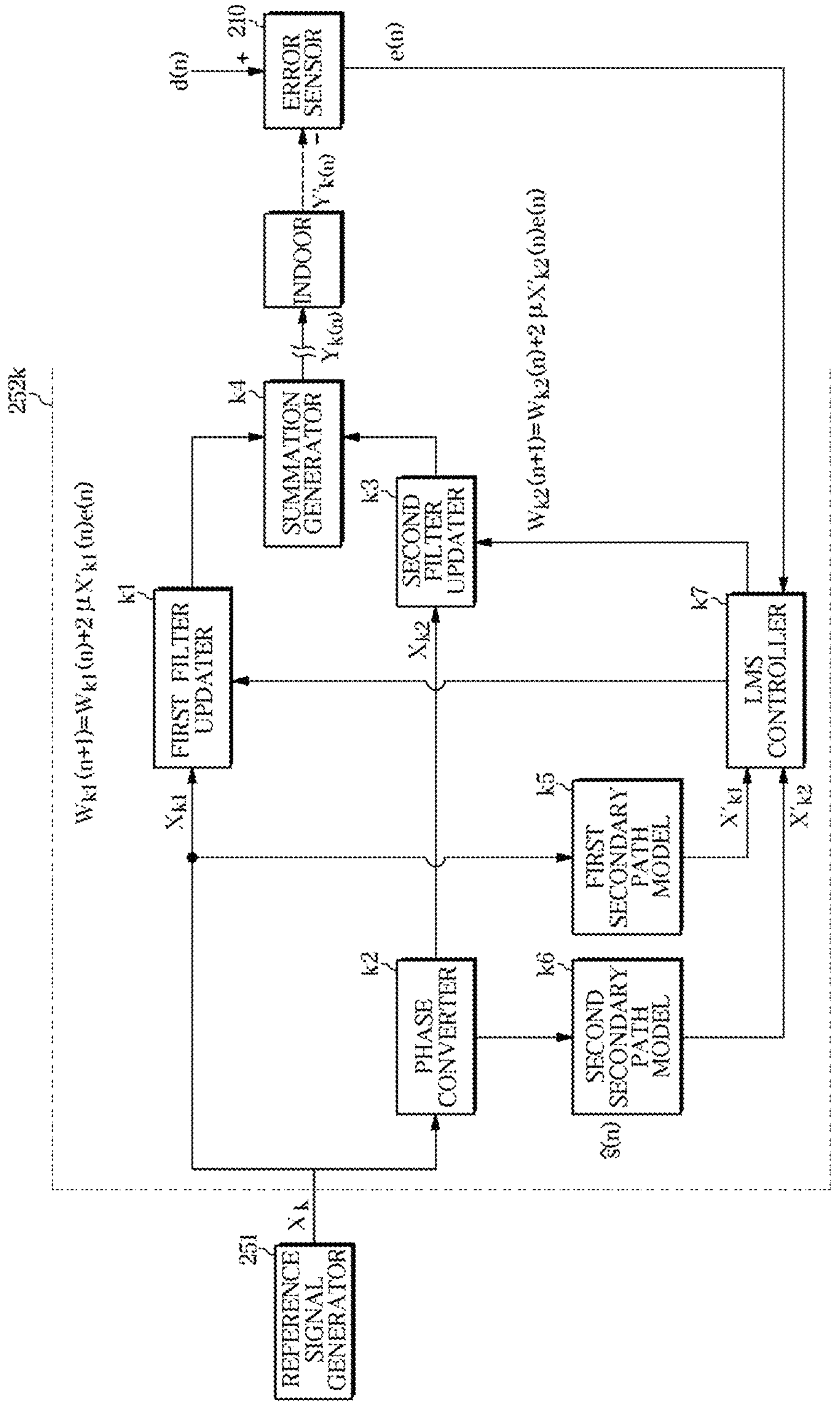
FIG. 6 is a detailed block diagram illustrating a filtered-x least mean squared (FxLMS) operator of the active noise canceller shown in FIG. 5.

FIG. 6 is a detailed block diagram illustrating a filtered-x least mean squared (FxLMS) operator of the active noise canceller shown in FIG. 5.

Figure 7:
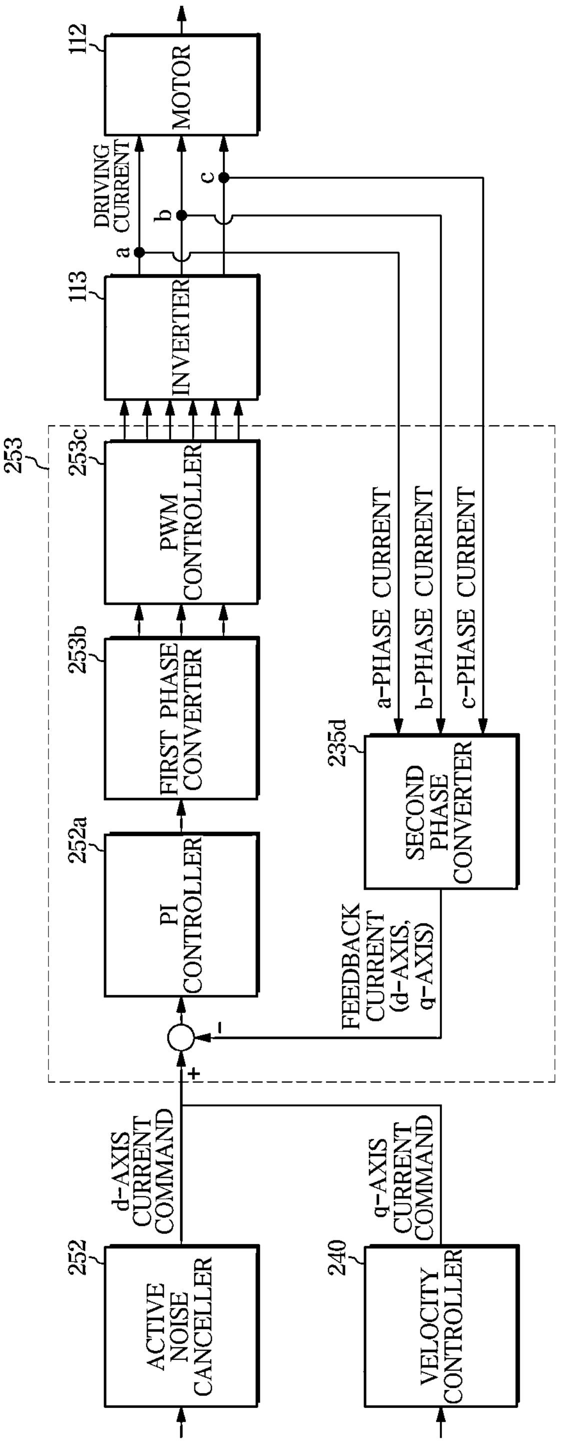
FIG. 7 is a detailed block diagram illustrating a magnetic flux reference controller (Field-Oriented Control: FOC) of a motor control apparatus provided in a vehicle according to an embodiment.

FIG. 7 is a detailed block diagram illustrating a magnetic flux reference controller (Field-Oriented Control: FOC) of a motor control apparatus provided in a vehicle according to an embodiment.

Figure 8:
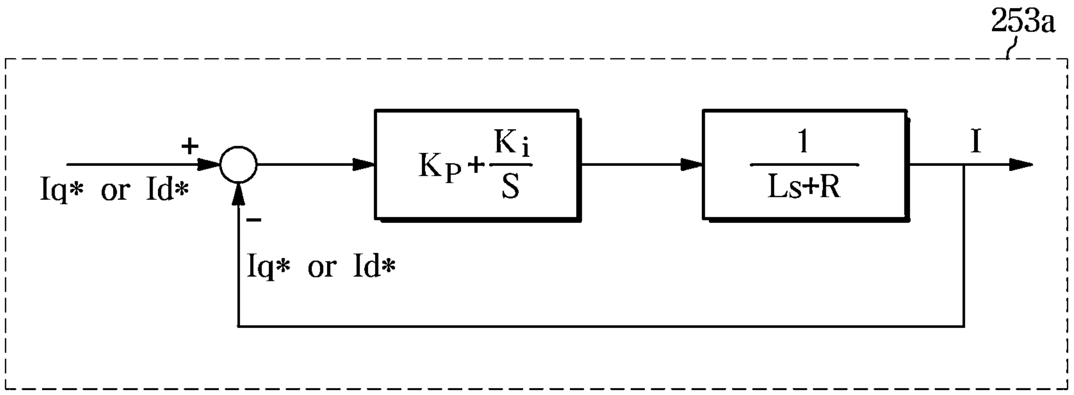
FIG. 8 is a detailed block diagram illustrating a proportional integral controller of a motor control apparatus provided in a vehicle according to an embodiment.

FIG. 8 is a detailed block diagram illustrating a proportional integral controller of a motor control apparatus provided in a vehicle according to an embodiment.

Figure 9:
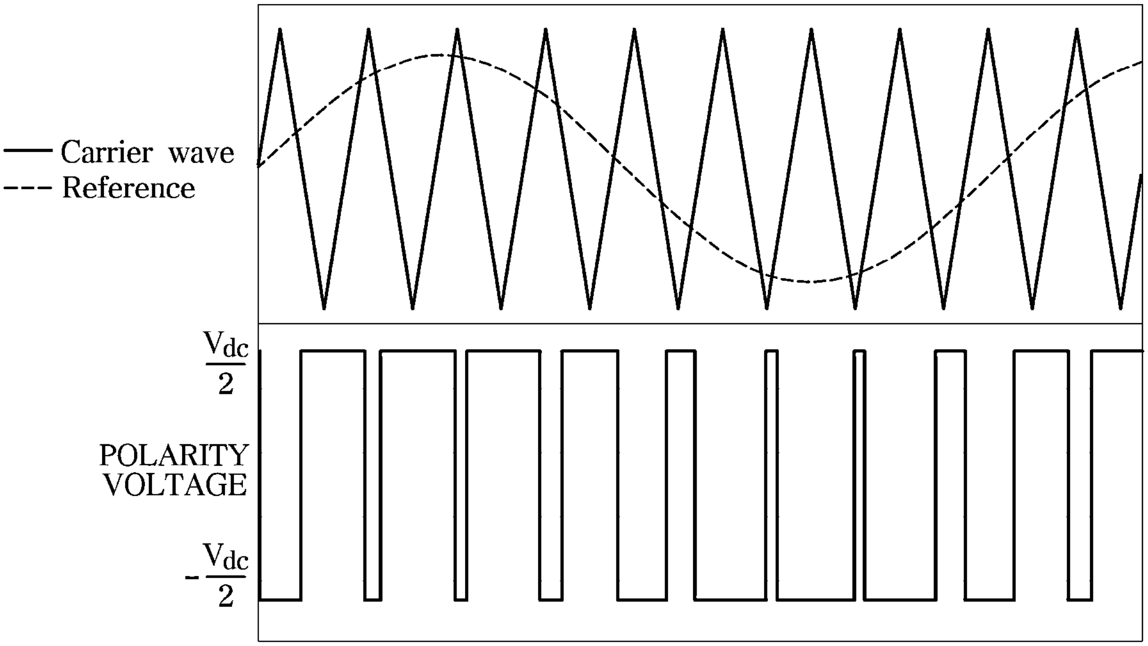
FIG. 9 is a diagram illustrating pulse-width modulation of a motor control apparatus provided in a vehicle according to an embodiment.

FIG. 9 is a diagram illustrating pulse-width modulation of a motor control apparatus provided in a vehicle according to an embodiment.

As shown in FIG. 4, the motor control apparatus 200 provided in the vehicle may include an error sensor 210, a converter 220, a position controller 230, a velocity controller 240, and a current controller 250.

The error sensor 210 detects information corresponding to noise in the interior, that is, in a predetermined space of the vehicle.

The error sensor 210 may include a microphone that detects a sound pressure signal inside the vehicle. The information detected by the error sensor 210 may correspond an error between noise (a current value) introduced into the interior of the vehicle from the motor 112, which is a noise source, and radiation sound (a target value) by a vibration generated by controlling the motor 112 to remove the noise.

The microphone may be provided in the interior of the vehicle, at a position corresponding to the position of the user's ear in the vehicle. The microphone detects noise that may be heard by the occupants inside the vehicle.

The microphone may be provided in the interior of the vehicle, on a head lining of an upper inner side of the vehicle, or on at least one of a front windshield, a rear windshield, an overhead console, and a rearview mirror.

The microphone may be provided in one unit or a plurality of units thereof and may be provided as a directional microphone.

The error sensor 120 may be a sensor generally used for an active noise control logic based on a filtered-x least mean square (FxLMS) algorithm.

The error sensor 120 is a sensor for performing adaptive control by updating a filter of the FxLMS algorithm to reduce the difference between a target value and a current value.

The error sensor 210 may include an acceleration sensor for detecting an acceleration corresponding to vibration of the motor of the vehicle. Information detected by the error sensor 210 corresponds to an error between original noise (a current value) of the motor 112, which is a noise source, and radiation sound (a target value) by vibration generated by controlling the motor 112 to remove the original noise.

The acceleration sensor may be provided in a casing of the motor 112 or at a surrounding of the motor 112.

In addition to the acceleration sensor, at least one of a gyro sensor, a motion sensor, a displacement sensor, and a torque sensor may be included.

Depending on whether the error sensor is a microphone or an acceleration sensor, the type of the converter may vary.

Depending on whether the error sensor is a microphone or an acceleration sensor, the installation location of the error sensor may vary. Thus an impact response function (IRF) of a secondary path model included in a plurality of FxLMS operators may also vary.

The converter 220 converts an analog signal for a current output from the error sensor 210 into a digital signal and transmits the converted digital signal to the current controller. The converted digital signal may be a digital signal for the current.

The position controller 230 controls the position of the motor 112 using proportional integral control or the like for travelling performance of the vehicle.

More specifically, the position controller 230 receives a position command Θ* to control the position of the motor 112 during travel of the vehicle. The position command may be a target position.

The position controller 230 receives a position Θ of the motor detected by the position sensor 121 and obtains a position difference value (Θ*−Θ) between the received position of the motor and the position command and performs proportional integral control to decrease the obtained position difference value.

The position controller 230 may generate a velocity command of the motor to follow the position command.

The position of the motor may include angle information.

The velocity controller 240 controls the velocity of the motor 112 through proportional integral control.

The velocity controller 240 receives a velocity command ω* to control the velocity of the motor 112 during travelling of the vehicle. The velocity command may be a target velocity.

More specifically, the velocity controller 240 may receive a velocity w of the motor 112 detected by the velocity sensor 123, obtain a velocity difference value (ω*−ω) between the received velocity of the motor and the velocity command, and perform proportional integral control to reduce the obtained velocity difference value. The velocity of the motor may be revolutions per minute (RPM).

The velocity controller 240 compares the target velocity (or the velocity command, ω*) with the RPM ω of the motor detected by the velocity sensor 123 and generates a current command I* according to a result of the comparison.

The velocity controller 240 may generate a current command for tracking the velocity command. The current command output from the velocity controller 240 may be a q-axis current command lq*.

The q-axis current may be a current of a torque component of the motor.

The velocity controller 240 may include a proportional controller P, a proportional integral controller PI, or a proportional integral derivative controller PID.

The current controller 250 generates a d-axis current command Id* based on the RPM w of the motor detected by the velocity sensor 123. The d-axis current may be a current of a magnetic flux component.

The current controller 250 may generate a voltage command for following the q-axis current command and the d-axis current command. The current controller 250 may generate a voltage command $$V_{abc}^{*}$$

of a-phase, b-phase, and c-phase based on the d-axis current command and the q-axis current command.

The current controller 250 may generate the voltage command $$V^{*}_{abc}$$

based on a current $I_{abc}$ detected by the current sensor 121, a q-axis current command, and a d-axis current command.

The current controller 250 may include a proportional controller, a proportional integral controller, or a proportional integral and derivative controller.

More specifically, the current controller 250 may, based on the velocity w of the motor and the detected current $I_{abc}$, obtain d-axis and q-axis current commands to be applied to the motor, and based on the q-axis current commands, generate a voltage command to be applied to the motor 112, in which the voltage command may be generated through pulse-width modulation (PWM).

The current controller 250 may control on/off of the inverter 113 of a driving unit based on a pulse-width modulation signal to adjust the current applied to the motor 112, thereby allowing the motor 112 to rotate at a velocity corresponding to the adjusted current.

The current controller 250 converts phase-a, phase-b, and phase-c currents of the motor into d-axis and q-axis currents, and converts phase-a, phase-b, and phase-c voltages into d-axis and q-axis voltages.

The d-axis refers to an axis of a direction coinciding with the direction of a magnetic field generated by the rotor of the motor, and the q-axis refers to an axis of 90 degrees ahead of the direction of the magnetic field generated by the rotor. 90 degrees refers to an electrical angle obtained by converting an angle between adjacent North (N) poles or an angle between adjacent South (S) poles included in the rotor based on 360 degrees, not a mechanical angle of the rotor.

When the motor 112 is controlled, vibration by the d-axis current command is transmitted via the frame 104 to the body 101 in the form of a radiation sound and is used to cancel the noise of the motor 112, and at the same time, the torque by the q-axis control generated in the motor 112 through the position, velocity, and torque control of the motor 112 is transmitted via the reducer 114 to the drive shaft 115 and is used to drive the vehicle 1.

The current controller 250 may simultaneously perform torque control and active noise removal control on the motor.

The current controller 250 may include a reference signal generator 251, an active noise canceller 252, and a magnetic flux reference controller 253.

The reference signal generator 251 receives the velocity of the motor 112 detected by the velocity sensor 123. The velocity of the motor 112 may be the RPM of rotations of the motor 112.

The reference signal generator 251 generates a reference signal based on the received RPM of the motor 112. The reference signal may be a signal in the form of a sine wave. The reference signal is described as a reference signal or a reference sine wave signal.

The reference signal generator 251 may obtain a frequency of the motor 112 based on the received RPM of the motor 112 and generate a reference signal based on the obtained frequency of the motor 112. In addition, the frequency of the motor may be a rotational velocity of the motor per second.

The reference signal generator 251 generates a plurality of reference sine wave signals respectively corresponding to a plurality of frequency components that requires noise reduction.

The reference signal generator 251 may include a parallel multiple sine wave generator. The parallel multiple sine wave generator may generate a plurality of reference sine wave signals respectively corresponding to a plurality of frequency components.

The reference signal generator 251 may generate reference signals corresponding to first to $k^{th}$ frequency components in the form of a sine wave and output the generated reference signals in the form of a sine wave.

The reference signal generator 251 may generate and output a plurality of reference sine wave signals.

The plurality of reference sine wave signals may include a basic component (i.e., a fundamental frequency) of the motor noise and multiples thereof (i.e., multiple frequencies). The multiples may vary depending on a frequency band causing the noise.

For example, when the basic components of problematic motor noise are the 1st and 7th frequency components, and a multiple to be controlled is selected up to the third multiple, the reference signal generator 251 may set the $1^{st}$ frequency×1=the $1^{st}$ order (the basic component), the 1st frequency×2=the 2nd order, the 1st frequency×3=the $3^{rd}$ order, the $7^{th}$ frequency×1=the $7^{th}$ order (the basic component), the $7^{th}$ frequency×2=the 14th order, the $7^{th}$ frequency×3=the $21^{th}$ order, that is, a total of six components, as reference sine wave signals for the active noise cancellation control.

The reference signal generator 251 may output first, second, third, fourth, fifth, and sixth reference sine wave signals.

As another example, when the motor noise has $4^{th}$ and $12^{th}$ frequency components and a multiple to be controlled is selected up to the fourth multiple, the reference signal generator 251 may exclude overlapping components and determine the $4^{th}$, $8^{th}$, $12^{th}$, $16^{th}$, $24^{th}$, $36^{th}$, and $48^{th}$ order components, that is, a total of seven components as reference sine wave signals for active noise cancellation control.

The reference signal generator 251 may output first, second, third, fourth, fifth, sixth, and seventh reference sine wave signals.

In addition, the order of the frequency is determined by the noise that is the most problematic in the room, and the multiple may be determined in a process of controlling the motor to generate vibration and using radiation sound generated from the vibration to offset the indoor noise.

The order of the frequency and the multiple thereof are obtained by experiment and may be information stored in advance. In one embodiment, the multiple may be determined up to third or fourth multiples.

The active noise canceller 252 receives the plurality of reference sine wave signals each having a different frequency from the reference signal generator 251.

The active noise canceller 252 receives the error signal detected by the error sensor 210 at each preset sampling frequency and based on each of the reference sine wave signals and the error signal, performs active noise control based on a filtered-x least mean squared (FxLMS) algorithm.

The active noise canceller 252 may be a parallel multiple active noise canceller.

The parallel multiple active noise canceller applies the FxLMS algorithm to each of the plurality of reference sine wave signals in a parallel manner to update an LMS filter value at every sampling period.

As shown in FIG. 5, the active noise canceller 252 may receive a plurality of reference sine wave signals k having different frequencies from the reference signal generator 251.

The plurality of reference sine wave signals may include a first reference sine wave signal, a second reference sine wave signal, . . . and a $k^{th}$ reference sine wave signal. k is a number corresponding to the total number of frequencies and may be a natural number.

In the present embodiment, an example having three reference sine wave signals is described.

The active noise canceller 252 may include a plurality of FxLMS operators that update the LMS filter value at every sampling period using the FxLMS algorithm.

The number of the plurality of FxLMS operators may be determined by the number of reference sine wave signals received from the reference signal generator 251. The number of the plurality of FxLMS operators may be a preset number.

In addition, the reference sine wave signal may be provided as a single reference sine wave signal, and the FxLMS FxLMS operator may also be provided as a single FxLMS operator.

The plurality of FxLMS operators may include a first FxLMS operator 252-1, a second FxLMS operator 252-2, . . . and a $k^{th}$ FxLMS operator **252-*k***.

In the present embodiment, an example having three FxLMS operators is described.

The first FxLMS operator 252-1 receives the first reference sine wave signal and receives the error signal detected by the error sensor 210.

The first FxLMS operator 252-1 reflects the first reference sine wave signal and the error signal in the FxLMS algorithm, to update a preset filter value and calculate a first target signal to be controlled. The preset filter value may include a first filter value and a second filter value. The first and second filter values are described with reference to FIG. 6.

The second FxLMS operator 252-2 receives the second reference sine wave signal and receives the error signal detected by the error sensor 210.

The second FxLMS operator 252-2 reflects the second reference sine wave signal and the error signal in the FxLMS algorithm, to update the preset filter value and calculate a second target signal to be controlled.

The third FxLMS operator 252-3 receives the third reference sine wave signal and receives the error signal detected by the error sensor 210.

The third FxLMS operator 252-3 reflects the third reference sine wave signal and the error signal in the FxLMS algorithm, to update the filter value and calculate a third target signal to be controlled.

As shown in FIG. 5, the active noise canceller 252 may further include a signal summation generator **252*a***.

The signal summation generator **252*a* receives the target signals calculated by the plurality of FxLMS operators, takes a sum of the received target signals. The signal summation generator 252*a* then outputs the sum of the target signals to the magnetic flux reference controller 253**, in which the sum of the target signals is output to a channel corresponding to the d-axis of the motor.

The active noise canceller 252 determines a d-axis current command of the motor for noise reduction based on the sum of the target signals obtained by the signal summation generator **252*a* and outputs the determined d-axis current command to the magnetic flux reference controller 253**.

The operation algorithms of the FxLMS operators in the active noise canceller 252 may be the same as each other.

The only difference may be a $k^{th}$ reference sine wave signal, which is an input signal, and a processing result obtained by a first filter updater and a second filter updater for updating the filter in the FxLMS operator.

Accordingly, an operation algorithm of the $k^{th}$ FxLMS operator **252-*k* is described with reference to FIG. 6**.

As shown in FIG. 6, the $k^{th}$ FxLMS operator **252-*k* includes a first filter updater k1, a phase converter k2, a second filter updater k3, a summation generator k4, a first secondary path model k5, a second secondary path model k6, and an LMS controller k7**.

The first filter updater k1 may receive a $k^{th}$ reference signal $X_k$ from the reference signal generator 251. The $k^{th}$ reference signal may be a reference signal Xk1 in the form of a sine wave.

The $k^{th}$ reference signal $X_k$ represents a vector of a reference signal with respect to a $k^{th}$ frequency component. The $k^{th}$ reference signal $X_k$ may be a sum of a sine wave and a cosine wave that are orthogonal to each other. The magnitude of the $k^{th}$ reference signal $X_k$ may be determined through filter update and conforms to a narrow band FxLMS algorithm.

The first filter updater k1 filters the $k^{th}$ reference signal Xk1 based on a preset first filter value, and outputs a filtered $k^{th}$ reference sine wave signal.

The first filter updater k1 perform update on the first filter value based on a filter value received from the LMS controller k7.

The first filter updater k1 may also be updated by the LMS controller k7.

The first filter updater k1 may update the first filter value through Equation 1. The $k^{th}$ reference signal Xk1 refers to a $k^{th}$ reference sine wave signal Xk1.

$$w_{k1}(n+1) = w_{k1}(n) + 2\mu x'_{k1}(n)e(n) \qquad \text{[Equation 1]}$$

When the filter value is updated, the first filter updater k1 filters the $k^{th}$ reference sine wave signal Xk1 based on the updated first filter value, and outputs the filtered $k^{th}$ reference sine wave signal.

The phase converter k2 may receive the $k^{th}$ reference signal from the reference signal generator 251.

The phase converter k2 performs a phase shift of 90 degree on the $k^{th}$ reference signal and output a signal having a phase shifted by a 90-degree with respect to the $k^{th}$ reference signal. The signal obtained by performing the phase shift on the $k^{th}$ reference signal by 90 degrees may be a $k^{th}$ reference cosine wave signal $X_{k2}$.

The second filter updater k3 may receive the $k^{th}$ reference cosine wave signal from the phase converter k2.

The second filter updater k3 filters the $k^{th}$ reference cosine wave signal $X_{k2}$ based on a preset second filter value, and outputs a filtered $k^{th}$ reference cosine wave signal.

The second filter updater k3 updates the second filter value based on a filter value received from the LMS controller k7.

The second filter updater k3 may be updated by the LMS controller k7.

The second filter updater k3 may update the second filter value through Equation 2.

$$w_{k2}(n+1) = w_{k2}(n) + 2\mu x'_{k2}(n)e(n) \quad \text{[Equation 2]}$$

In Equations 1 and 2, p is a step size, and may be a preset value.

μ may employ a variable frequency value through an impulse response function of a secondary path.

The process of determining the step size p may follow a general filtered-x least mean squared (FxLMS), and modified algorithms, such as Normalized FxLMS, and Leaky FxLMS.

When the filter value is updated, the second filter updater k3 filters the $k^{th}$ reference cosine signal $Xk_2$ based on the updated second filter value, and outputs a filtered $k^{th}$ reference cosine wave signal.

The summation generator k4 receives the signal output from the first filter updater k1 and the signal output from the second filter updater k3 and takes a sum of the received signal of the first filter updater k1 and the received signal of the second filter updater k3 and outputs a summation signal $Y_k(n)$.

The summation signal may be a $k^{th}$ target signal for noise removal.

The $k^{th}$ target signal $Y_k(n)$ output from the summation generator k4 may be expressed as Equation 3.

$$y_k(n) = w_k^T(n)x_k(n) \quad \text{[Equation 3]}$$

$$w_k^T = [\, w_{k1} \;\; w_{k2} \,]$$

$$x_k = [\, x_{k1}(n) \;\; x_{k2}(n) ]^T$$

$$x_{k1} = \sin((\omega_k nT), x_{k2}(n) = \cos(\omega_k nT)$$

T is the sampling time. n may be an integer, such as 1, 2, 3, . . . and the like.

$\omega_k$ is a $k^{th}$ target frequency for removing noise ($\omega_k=2\pi f_k$)

In the interior of the vehicle, noise corresponding to $y'_k(n)$ may occur.

The error sensor 210 may detect noise corresponding to $y'_k(n)$ and a disturbance d(n) and output the difference between the disturbance and a target sound for noise removal as an error signal e(n).

$$e(n) = d(n) - \sum_{k=1}^{N} y'_k(n) \quad \text{[Equation 4]}$$

The first secondary path model k5 may receive the $k^{th}$ reference signal $X_k$ from the reference signal generator 251. The $k^{th}$ reference signal $X_k$ may be a k reference sine wave signal $X_{k1}$.

The first secondary path model k5 may include a filter ŝ(n) in which a secondary path, that is, a path between the motor and the error sensor 210, is modeled as an impact response function.

The first secondary path model k5 may obtain a signal corresponding to the $k^{th}$ reference sine wave signal in the secondary path using the filter.

The signal obtained from the first secondary path model k5 may be expressed as Equation 5.

$$x'_{k1}(n) = \hat{s}(n) * x_{k1}(n) \quad \text{[Equation 5]}$$

The second secondary path model k6 may receive the $k^{th}$ reference cosine wave signal from the phase converter k2.

The second secondary path model k6 may include a filter ŝ(n) in which the secondary path, that is, a path between the motor and the error sensor 210 is modeled as an impact response function.

The second secondary path model k6 may obtain a signal corresponding to the $k^{th}$ reference cosine wave signal in the secondary path using the filter.

The signal obtained by the second secondary path model k6 may be expressed as Equation 6.

$$x'_{k2}(n) = \hat{s}(n) * x_{k2}(n) \quad \text{[Equation 6]}$$

The secondary path may be a path in which noise remaining after noise removal by the sound from the vibration of the motor 112 is still present and thus detected by the error sensor 210.

Modeling of the impulse response function may be obtained by calculating a frequency response function and then performing inverse fast Fourier transform (FFT).

The LMS controller k7 may receive an error signal output from the error sensor 210.

The LMS controller k7 may receive a signal filtered by the first secondary path model k5 and a signal filtered by the second secondary path model k6.

The LMS controller k7 may, based on the error signal detected by the error sensor 210, the signal filtered by the first secondary path model k5, and the signal filtered by the second secondary path model k6, obtain filter values of the first and second filter updaters k1 and k3 through Equations 1 and 2, and update the first and second filter updaters k1 and k3 based on the obtained filter values.

The LMS controller k7 may also transmit the obtained filter values to the first and second filter updaters k1 and k3.

The LMS controller k7 updates the filter values of the first and second filter updaters k1 and k3 every sampling time. Accordingly, the summation generator 252*a* may acquire the target signal y(n) corresponding to a current command at each sampling time. By repeating this process, the noise canceling effect may be improved.

The $k^{th}$ target signals output from the summation generators k4 of the plurality of filtered-x least mean squared (FxLMS) operators may be transmitted to the signal summation generator 252*a*.

The signal summation generator 252*a* may take a sum of the target signals output from the summation generators k4 of the plurality of FxLMS operators and transmit the summation signal to the magnetic flux reference controller 253.

For example, the signal summation generator 252*a* may take a sum of the first, second, and third target signals output from the summation generators of the first, second, and third FxLMS operators 252-1, 252-2, and 252-3, and may transmit the summation target signal to the magnetic flux reference controller 253.

The magnetic flux reference controller (Field-Oriented Control: FOC, 253) receives a d-axis current command of the motor for noise reduction from the active noise canceller 252, and a q-axis current command of the motor for torque control from the velocity controller 240.

The magnetic flux reference controller 253 performs magnetic flux reference control based on the d-axis current command and the q-axis current command.

The magnetic flux reference controller 253 performs proportional integral (PI) control and phase change to simultaneously perform a noise reduction control on noise generated in the motor and a torque control for travel of the vehicle.

The magnetic flux reference controller 253 may perform a magnetic flux reference control (FOC) algorithm and output a voltage command to the inverter 113.

The magnetic flux reference controller 253 may convert the coordinate axes of three phases of the motor into two coordinate axes, that is, a magnetic flux direction axis and an axis orthogonal to the magnetic flux direction axis. The q-axis is a rotation direction of the motor and is used for motor torque control, and the d-axis is a centrifugal force direction of the motor and is used to generate vibration of the motor for noise control.

The magnetic flux reference controller 253 may compensate for the counter electromotive force of the d-axis and the q-axis. The magnetic flux reference controller 253 may compensate for the counter electromotive force of the d-axis and q-axis of the motor 112 based on the velocity of the motor 112, the inductances of the d-axis and the q-axis, the current commands of the d-axis and the q-axis, and the magnetic flux of the motor.

The magnetic flux reference controller 253 of the current controller 250 is described with reference to FIGS. 7-9.

Referring to FIG. 7, the magnetic flux reference controller 253 includes a proportional integral (PI) controller 253*a*, a first phase converter 253*b*, a pulse-width modulation controller 253*c* and a second phase converter 253*d.*

The PI controller 253*a* receives a d-axis current command from the active noise canceller 252 and a q-axis current command from the velocity controller 240.

The PI controller 253*a* performs proportional and integral control PI control on the command currents of each axis.

The d-axis represents the centrifugal force direction of the motor, and the q-axis represents the rotation direction of the motor.

As shown in FIG. 8, the PI controller 253*a* may include a transfer function including a proportional gain $K_p$, an integral gain $K_i$, an inductance L of the motor, a motor resistance R, and the like.

The PI controller 253*a* may perform proportional and integral control on each axis through the transfer function, output a current I for the proportional and integral control for each axis, receive a current output for each axis as feedback, and perform proportional and integral control using the fed back current for each axis.

The PI controller 253*a* may include a proportional integral controller that receives a d-axis current command for noise removal and uses the received d-axis current command to perform proportional integral control and a proportional integral controller that receives a q-axis current command for torque control of the motor and uses the received q-axis current command to perform proportional integral.

The first phase converter 253*b* may convert the d-axis and the q-axis into three phases a, b, and c.

The first phase converter 253*b* may be a 2 phase-3 phase converter that converts two phases into three phases.

The first phase converter 253*b* receives current signals of the two axes that have passed through the proportional integral controller 253*a* and converts the received current signals of the two axes (the d-axis and the q-axis) into three phase (a, b, and c) voltage signals.

The first phase converter 253*b* converts a d-axis voltage command $$V_d^*$$

and a q-axis voltage command $$V_q^*$$

into a, b and c phase voltage commands $$V_{abc}^*.$$

The first phase converter 253*b* may convert two phases into three phases using a FOC algorithm.

The PWM controller 253*c*, in order to control the amount of current in a digital manner, modulates the pulse-width of the current signal and transmits the pulse-width modulated signal to the inverter 113.

The PWM controller 253*c* generates a control signal to be provided to the inverter 113 based on the a, b, and c phase voltage commands $$V_{abc}^*.$$

The PWM controller 253*c* performs PWM on each of the a, b, and c phase voltage commands $$V_{abc}^*$$

to output control signals that turn on/off the plurality of switching circuits $Q_{11}$-$Q_{13}$ and $Q_{21}$-$Q_{23}$ of the inverter 113.

The PWM controller 253*c* may modulate the pulse-width by using a sinusoidal PWM (SPWM) method that modulates the pulse-width through triangular wave comparison or a space vector PWM (SVPWM) method that modulates the pulse-width through a space vector in a complex space.

The PWM controller 253*c* digitally controls the amount of current to generate three-phase sinusoidal current signals each having a phase difference of 120 degrees.

An example of modulating the pulse-width using the SPWM method is described. In FIG. 9, in order to obtain a digital control signal from a sinusoidal target voltage, the PWM controller 235*c* may compare a sinusoidal target signal with a triangular carrier wave, and indicate a negative pole voltage when the sinusoidal target signal is lower than the triangular carrier wave, and indicate a positive pole voltage when the sinusoidal target signal is higher than the triangular carrier. A pulse signal composed of a plus value and a minus value may be generated.

The second phase converter 253*d* may receive a current signal detected by the current sensor. The second phase converter 253*d* may receive a current signal of three phases a-b-c applied to the motor 112.

The second phase converter 253$d$ converts the current signal of three phases a-b-c into two phases of the d-axis and the q-axis and inputs the negative values of the converted current signals of the two phases of the d-axis and the q-axis to the PI controller 253$a$ as feedback.

The second phase converter 253$d$ may be a three phase-two phase converter that converts three phases into two phases.

Below is a matrix that transforms a motor's three-phase coordinate system into a two-phase (d-axis and q-axis) coordinate system rotated at an arbitrary angle Θ.

A two phase-three phase coordinate transformation matrix may be by calculating the inverse of the matrix shown above.

$$T(\theta)=\frac{2}{3}\begin{bmatrix}\cos\theta & \cos\left(\theta-\frac{2}{3}\pi\right) & \cos\left(\theta-\frac{4}{3}\pi\right)\\ -\sin\theta & -\sin\left(\theta-\frac{2}{3}\pi\right) & -\sin\left(\theta-\frac{4}{3}\pi\right)\\ \frac{1}{2} & \frac{1}{2} & \frac{1}{2}\end{bmatrix}$$

The motor control apparatus 200 may include a memory (not shown) for storing data regarding an algorithm for controlling the operations of the components of the motor control apparatus 200 or a program that represents the algorithm, and a processor (not shown) that performs the above-described operations using the data stored in the memory. The memory and the processor may be implemented as separate chips. Alternatively, the memory and the processor may be implemented as a single chip.

The memory may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random-access memory (RAM), or other storage media, such as a hard disk drive (HDD), a compact disc ROM (CD-ROM), and the like, but the implementation of the memory is not limited thereto.

At least one component may be added or omitted to correspond to the performance of the components shown in FIGS. 2-8. In addition, the mutual positions of the components may be changed to correspond to the performance or structure of the noise control apparatus.

A sequence of operations of the motor control apparatus in which the driving control of the vehicle and the active noise control are simultaneously performed is described with reference to FIGS. 2 and 3.

A current of the motor current detected by the current sensor 121 during travel of the vehicle may be fed back to the motor control apparatus 200. In addition, the position of the rotor detected by the position sensor 122 and the velocity of the motor detected by the velocity sensor 123 may also be fed back to the motor control apparatus 200.

The motor control apparatus 200 performs position control on the motor based on a position command and the position of the rotor detected by the position sensor during travel of the vehicle and performs velocity control on the motor based on a velocity command and the velocity of the motor detected by the velocity sensor.

The motor control apparatus 200 may generate the velocity command for controlling the position of the motor and may generate a q-axis current command for controlling the velocity of the motor.

The motor control apparatus 200 may obtain q-axis current through a phase conversion on three-phase current detected by the current sensor 121 and based on the obtained q-axis current and a q-axis current command, perform current control on the q-axis. The q-axis current is a current for a torque component and performing the q-axis current control may be controlling the torque of the motor.

The motor control apparatus 200 generates a reference sine wave signal based on the velocity of the motor detected by the velocity sensor 123 and generates a d-axis current command based on the generated reference sine wave signal and an error signal detected by the error sensor.

The motor control apparatus 200 may obtain d-axis current through a phase conversion on three-phase current detected by the current sensor 121 and based on the obtained d-axis current and a d-axis current command, performs current control on a d-axis. The d-axis current is a current for an original noise component of the motor and performing the d-axis current control may be controlling the original noise cancellation of the motor.

The motor control apparatus 200 outputs a current command for torque control to a channel corresponding to the q-axis of the motor and outputs a current command for noise reduction control to a channel corresponding to the d-axis of the motor.

The motor control apparatus 200 may, when converting the three-phase current signal detected by the current sensor 121 into a two-phase current signal, use a FOC algorithm to convert the three phase coordinate axes of the motor into two coordinate axes (d-axis and q-axis), that is, a magnetic flux direction coordinate axis and an axis orthogonal thereto.

The q-axis is a rotation direction of the motor and is used for torque control of the motor, and the d-axis is a centrifugal force direction of the motor and is used to generate vibration of the motor and remove noise from the motor.

The motor control apparatus 200 may perform PI control using the d-axis current command and may perform PI control using the q-axis current command.

The motor control apparatus 200 converts the d-axis and q-axis current commands into three-phase (a-b-c) current commands and based on the converted three-phase current commands and the three-phase current signals detected by the current sensor 121, controls the current of the motor. The motor control apparatus 200 may generate a voltage reference to control the current of the motor. The generated voltage command may be a, b, and c-phase voltage commands $$V_{abc}^{*}.$$

The motor control apparatus 200 may perform PWM on each of the phase a, b, and c-voltage commands $$V_{abc}^{*}$$

to generate a control signal to be provided to the inverter 113.

The motor control apparatus 200 may control the operation of the inverter 113 in response to the control signal. The motor 112 may be rotated by the operation of the inverter.

As described above, the motor control apparatus 200 may perform position control, velocity control, and torque control on the motor 112, to generate torque for driving the vehicle.

The torque generated by the motor may be transmitted to the reducer and the drive shaft. At the same time, the driving motor generates vibration. The vibration generated by the motor may be transmitted to the body 101 via the frame. In addition, the vibration transmitted to the body 101 may be transmitted to the interior of the vehicle in the form of radiation sound.

The interior of the vehicle may also be supplied with an original noise of the motor generated by the motor 112.

The original noise of the motor and the radiation sound may be superposed with each other in the interior of the vehicle. As a result, passengers may feel the noise reduction effect.

The noise superposed in the interior of the vehicle may be detected by the error sensor 210, and an error signal detected by the error sensor 210 may be input to the active noise canceller of the motor control apparatus via the converter 220.

The motor control apparatus may newly update the filter value of the FxLMS operator in the active noise canceller at every sampling frequency so that the magnitude of the error signal detected by the error sensor 210 decreases and uses the updated filter value to generate a target signal for active noise removal.

The motor control apparatus may obtain a d-axis current command based on the generated target signal.

With such a process, the motor control apparatus may update the d-axis current command and may effectively reduce the noise of the motor using the updated d-axis current command.

Hereinafter, the effects according to an embodiment of the disclosure are described with reference to FIGS. 10-12.

The first test is a case in which the revolutions per minute (RPM) of the motor is set to 1500 RPM, a microphone is used as an error sensor, and active noise cancellation control is performed on a single reference signal.

The noise component of the motor, which is problematic during constant velocity rotation of the motor, is a 16th-order component and corresponds to a frequency of 400 Hertz (Hz). Therefore, the experiment was conducted to reduce noise of the component.

The test was performed by setting the order to 1 (k=1) in the active noise canceller, using only the first FxLMS operator 252-1, and inputting a sine wave of a 400 Hz component, which is the frequency of the 16th order component, as the first reference signal.

Figure 10:
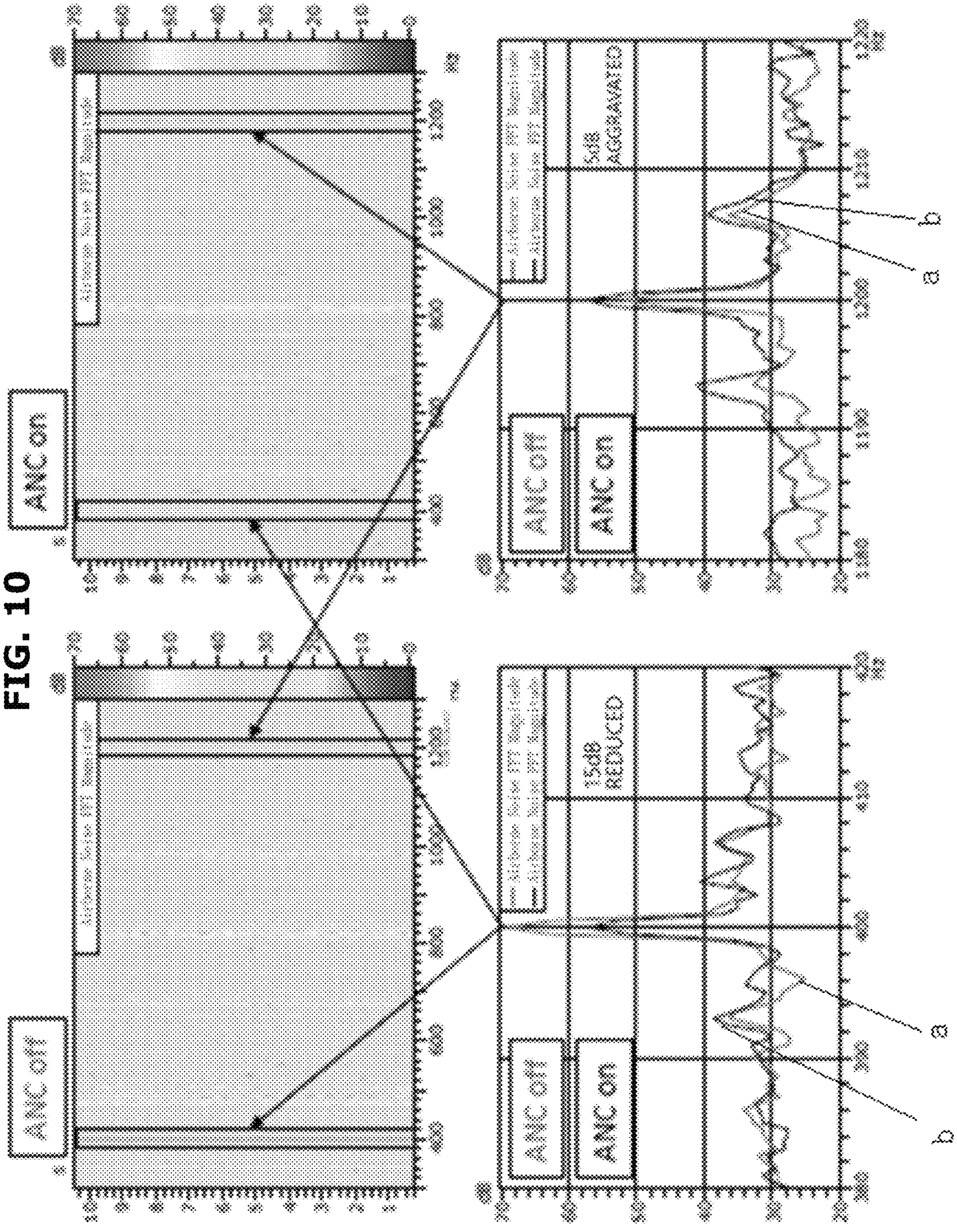
FIGS. 10-12 are diagrams for describing the effect according to an embodiment of the disclosure.

FIG. 10 is a diagram showing the result of the first test.

The upper side of FIG. 10 is a view showing a color map of noise, and the lower side of FIG. 10 is a view showing the frequency spectrum of the noise.

The frequency spectrum of "a" in the lower side of FIG. 10 is a frequency spectrum of noise when the active noise controller is turned off, and the frequency spectrum of "b" in the lower side of FIG. 10 is a frequency spectrum of noise when the active noise controller is turned on.

As shown in FIG. 10, it can be seen that the noise level is reduced by about 15 decibels (dB) at a target frequency of 400 Hz corresponding to the first reference signal, but at a frequency of 1200 Hz, which is three times the target frequency, the noise is rather deteriorated by 5 dB.

This represents that radiation sound generated using vibration of the motor generates noise of the opposite phase at the target frequency and thus noise is reduced, but at frequencies corresponding to multiples of the target noise, additionally generated radiation sound is not controlled in terms of phase, which results in aggravated noise.

This is a side effect occurring in a process of generating sound using vibration of a motor, and noise cancellation efficiency may be further improved using a parallel multiple active noise canceller.

In the second test, the RPM of the motor was set to 4500 RPM, a microphone was used as an error sensor, and a parallel multi-active noise cancellation control was performed on a plurality of reference signals.

The test was performed in a state in which the number of rotations of the motor increased and thus the frequency of the problematic noise increased to 1164 Hz.

For the active noise canceller, the test was performed by setting the order to 3 (k=3), using only the first, second, and third FxLMS calculation units 252-1, 252-2, 252-3, and inputting the 16th order (1164 Hz), the 32th order (2328 Hz), and the 48th order (3492 Hz) sine wave signals as the first, second, and third reference signals.

Figure 11:
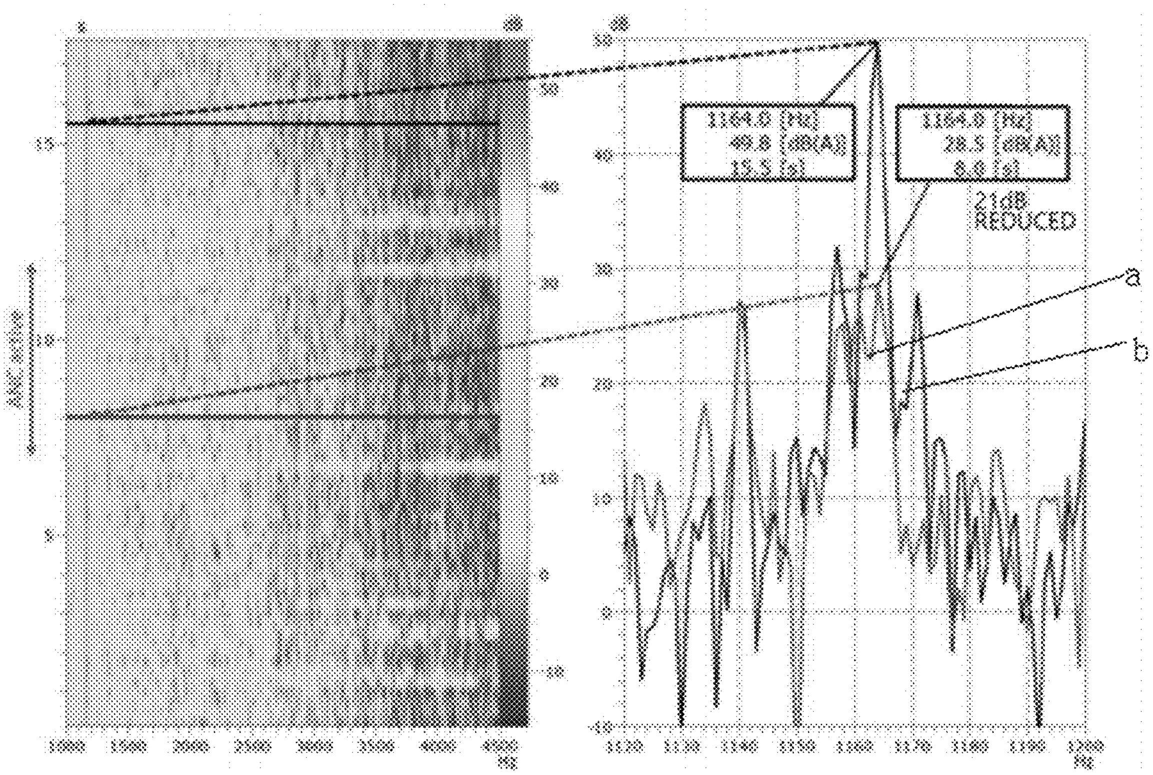

FIG. 11 is a diagram showing the result of the second test.

The left side of FIG. 11 is a diagram showing the color map of noise, and the right side of FIG. 11 is a diagram showing the frequency spectrum of the noise.

The frequency spectrum of "b" on the right side of FIG. 11 is a frequency spectrum of noise when the active noise canceller is turned off. The frequency spectrum of "a" on the right side of FIG. 11 is a frequency spectrum of noise when the active noise canceller is turned on.

As shown in FIG. 11, it can be seen that the noise level is reduced by about 21 dB at the target frequency of 1164 Hz, and the noise deterioration phenomenon does not appear at all at the frequencies of the multiples thereof in the color map of the left side of FIG. 11.

It can be seen that noise is greatly reduced at the target frequency without side effects by using the parallel multiple active noise canceller.

The third test is a case in which the RPM of the motor was set to 4500 RPM, an acceleration sensor was used as an error sensor, and parallel multi-active noise cancellation control was performed on a plurality of reference signals.

The test was performed in a state in which the number of rotations of the motor increased and thus the frequency of the problematic noise increased to 1164 Hz.

For the active noise canceller, the test was performed by setting the order to 3 (k=3), using only the first, second, and third FxLMS operators 252-1, 252-2, and 252-3, and inputting the 16th order (1164 Hz), the 32th order (2328 Hz), and the 48th order (3492 Hz) sine wave signals as the first, second, and third reference signals.

Figure 12:
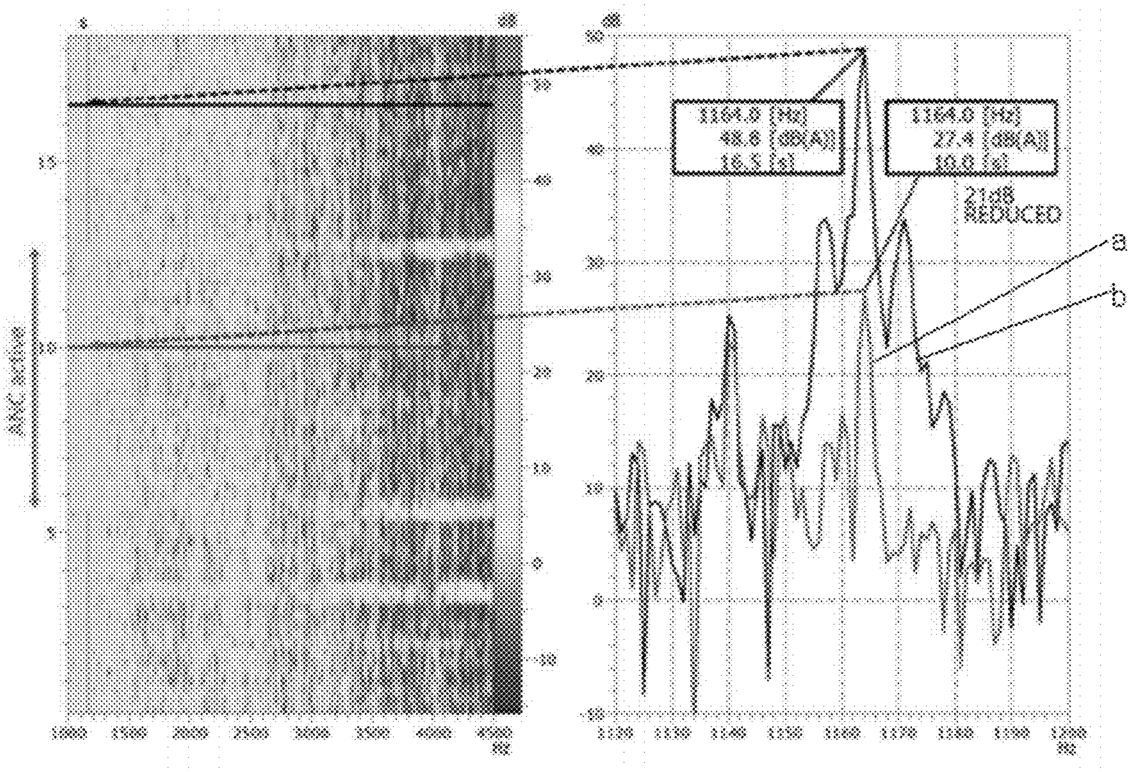

FIG. 12 is a diagram showing the result of the third test.

The left side of FIG. 12 is a diagram showing the color map of noise, and the right side of FIG. 12 is a diagram showing the frequency spectrum of the noise.

The frequency spectrum of "b" on the right side of FIG. 12 is a frequency spectrum of noise when the active noise canceller is turned off, and the frequency spectrum of "a" on the right side of FIG. 12 is a frequency spectrum of noise when the active noise canceller is turned on.

As shown in FIG. 12, it can be seen that the noise level is reduced by about 21 dB at the target frequency of 1164 Hz, and it can be seen that the noise deterioration phenomenon does not appear at all at the frequencies of the multiples thereof in the color map of noise on the left side of FIG. 12.

It can be seen that even when an acceleration sensor is used as an error sensor, noise may be greatly reduced at a target frequency without side effects by using a parallel multiple active noise canceller.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the disclosure is implemented to allow a motor of a vehicle to provide a torque required for travel while actively canceling noise of the motor through vibration of the motor so that the noise felt by the occupants in the vehicle during travel can be reduced and the silence of the vehicle can be improved The disclosure is implemented to perform independent control without affecting the driving performance, which is the original role of a motor of the vehicle.

The disclosure is implemented to use a motor, which is a noise source, as a device for noise cancellation, so that the influence of disturbance can be reduced compared to other active noise cancellation (ANC) systems using a speaker, and the like, and thus the noise reduction performance can be improved, and the target frequency can be increased to a higher frequency band.

The disclosure is implemented to use a motor of the vehicle to generate a vibration of an excitation force that is great enough to cancel noise of a large volume of noise during travel, so there is no need to install an additional structure, thereby reducing cost and weight for additional structure installation.

The disclosure is implemented to reduce noise of a motor through software control without using hardware, such as a radiation sound generating device, and thus offer economic benefit. In addition, such a configuration allows the weight of the vehicle to be reduced, so that the fuel efficiency can be improved.

The disclosure is implemented to apply a parallel multi-frequency noise cancellation method to noise at a large number of order components including multiples of a fundamental sound, such as motor noise of a vehicle, so that entire noise can be effectively reduced.

The disclosure can provide great convenience to the user, improve the marketability of the vehicle, further increase the user's satisfaction, improve the user's convenience and reliability, and secure the competitiveness of the product.

Although embodiments of the present disclosure have been described for illustrative purposes, those ordinarily skilled in the art should appreciate that various modifications, additions and substitutions are possible, without departing from the scope and spirit of the disclosure. Therefore, embodiments of the present disclosure have not been described for limiting purposes.

What is claimed is:

1. A motor control apparatus comprising:

an error sensor configured to detect noise of an indoor space and output the detected noise as an error signal;

a velocity sensor configured to detect a velocity of a motor that drives wheels;

a current controller configured to:

generate a reference signal based on the velocity of the motor detected by the velocity sensor;

filter the reference signal based on the error signal and a preset filter value; and generate a d-axis current command configured to reduce noise generated by the motor based on the filtered reference signal; and a velocity controller configured to generate a q-axis current command configured to control the velocity of the motor based on the velocity of the motor detected by the velocity sensor and a velocity command, wherein the current controller is further configured to generate a voltage command based on the d-axis current command and the q-axis current command and output the generated voltage command to an inverter, and wherein the current controller includes:

a basic signal generator configured to generate the reference signal;

an active noise canceller configured to filter the reference signal based on the error signal and the preset filter value and generate the d-axis current command based on the filtered reference signal; and a magnetic flux reference controller configured to perform phase-conversion on the d-axis current command and the q-axis current command and perform a pulse-width modulation on a signal obtained by the phase-conversion to generate a three-phase voltage command.

2. The motor control apparatus of claim 1, further comprising:

a position sensor configured to detect a position of a rotor of the motor; and a position controller configured to generate the velocity command configured to perform position control on the rotor of the motor based on the position of the rotor detected by the position sensor and a position command.

3. The motor control apparatus of claim 1, wherein the reference signal is a reference sine wave signal in a form of a sine wave, and wherein the active noise canceller includes:

a first filter updater configured to filter the reference sine wave signal based on the error signal and a preset first filter value;

a phase converter configured to convert a phase of the reference sine wave signal to generate a reference cosine wave signal;

a second filter updater configured to filter the reference cosine wave signal based on the error signal and a preset second filter value; and a summation generator configured to take a sum of the filtered reference sine wave signal and the filtered reference cosine wave signal.

4. The motor control apparatus of claim 3, wherein the active noise canceller includes:

a first secondary path model configured to filter the reference sine wave signal using a secondary path model;

a second secondary path model configured to filter the reference cosine wave signal using the secondary path model; and a least mean square (LMS) controller configured to:

update the first filter value of the first filter updater based on a signal obtained by filtering the reference sine wave signal in the first secondary path model and the error signal; and update the second filter value of the second filter updater based on a signal obtained by filtering the reference cosine wave signal in the second secondary path model and the error signal.

5. The motor control apparatus of claim 4, wherein the magnetic flux reference controller includes:

a proportional integral controller configured to perform proportional integration on the d-axis current command and perform proportional integration on the q-axis current command;

a first phase converter configured to convert the d-axis current command and the q-axis current command, which are subjected to proportional integration by the proportional integral controller, to have three phases;

a pulse-width modulation controller configured to modulate a pulse-width of a signal, which is converted to have three phases by the first phase converter, to generate the voltage command; and a second phase converter configured to convert a three-phase current of the motor detected by a current sensor into a two-phase current and provide the proportional integral controller with the two-phase current as feedback.

6. The motor control apparatus of claim 1, further comprising a converter configured to convert the error signal output from the error sensor into a digital signal, wherein the error sensor includes a microphone, or an acceleration sensor provided adjacent to the motor, and wherein noise detected by the error sensor is noise corresponding to a difference between original noise generated by the motor and noise generated by the motor that vibrates according to the d-axis current command.

7. A motor control apparatus comprising:

an error sensor configured to detect noise of an indoor space and output the detected noise as an error signal;

a velocity sensor configured to detect a velocity of a motor; and a current controller configured to:

generate a plurality of reference signals based on the velocity of the motor detected by the velocity sensor;

filter the plurality of reference signals based on the error signal and a preset filter value;

take a sum of the filtered plurality of reference signals to obtain a target signal; and generate a d-axis current command configured to reduce noise generated by the motor based on the target signal, wherein the plurality of reference signals includes at least one fundamental frequency having a fundamental component and a multiple frequency having a multiple component of the at least one fundamental frequency, and wherein the plurality of reference signals are reference sine wave signals in a form of a sine wave.

8. The motor control apparatus of claim 7, further comprising a velocity controller configured to generate a q-axis current command configured to control the velocity of the motor based on the velocity of the motor detected by the velocity sensor and a velocity command, wherein the current controller is configured to generate a voltage command based on the d-axis current command and the q-axis current command and output the generated voltage command to an inverter.

9. The motor control apparatus of claim 8, wherein the current controller includes:

a basic signal generator configured to generate the plurality of reference signals;

an active noise canceller configured to:

filter each of the plurality of reference signals based on the error signal and the preset filter value;

take a sum of the filtered reference signals to generate the target signal; and generate the d-axis current command based on the target signal; and a magnetic flux reference controller configured to perform phase-conversion on the d-axis current command and the q-axis current command and perform a pulse-width modulation on a signal obtained by the phase-conversion, to generate a three-phase voltage command.

10. The motor control apparatus of claim 9, wherein the active noise canceller includes:

a plurality of filtered-x least mean squared (FxLMS) operators configured to filter the plurality of reference signals, respectively; and a signal summation generator configured to take a sum of the reference signals filtered by the plurality of FxLMS operators.

11. The motor control apparatus of claim 10, wherein the preset filter value includes a preset first filter value and a preset second filter value, and each of the plurality of FxLMS operators includes:

a first filter updater configured to filter the reference sine wave signal based on the error signal and the preset first filter value;

a phase converter configured to convert a phase of the reference sine wave signal to generate a reference cosine wave signal;

a second filter updater configured to filter the reference cosine wave signal based on the error signal and the preset second filter value; and a summation generator configured to take a sum of the filtered reference sine wave signal and the filtered reference cosine wave signal.

12. The motor control apparatus of claim 11, wherein each of the plurality of FxLMS operators includes:

a first secondary path model configured to filter the reference sine wave signal using a secondary path model;

a second secondary path model configured to filter the reference cosine wave signal using the secondary path model; and a least mean square (LMS) controller configured to update the first filter value of the first filter updater based on a signal obtained by filtering the reference sine wave signal in the first secondary path model and the error signal and update the second filter value of the second filter updater based on a signal obtained by filtering the reference cosine wave signal in the second secondary path model and the error signal.

13. The motor control apparatus of claim 12, wherein the magnetic flux reference controller includes:

a proportional integral controller configured to perform proportional integration on the d-axis current command and perform proportional integration on the q-axis current command;

a first phase converter configured to convert the d-axis current command and the q-axis current command, which are subjected to proportional integration by the proportional integral controller, to have three phases;

a pulse-width modulation controller configured to modulate a pulse-width of a signal, which is converted to have three phases by the first phase converter, to generate the voltage command; and a second phase converter configured to convert a three-phase current of the motor detected by a current sensor into a two-phase current and provide the proportional integral controller with the two-phase current as feedback.

14. A vehicle comprising:

a drive shaft connected to wheels;

a motor connected to the drive shaft;

an inverter configured to adjust a voltage applied to the motor;

an error sensor configured to detect noise of an indoor space and output the detected noise as an error signal;

a velocity sensor configured to detect a velocity of the motor; and a motor control apparatus configured to:

generate a plurality of reference signals based on the velocity of the motor detected by the velocity sensor;

filter the plurality of reference signals based on the error signal and a preset filter value;

take a sum of the filtered plurality of reference signals to obtain a target signal;

generate a d-axis current command configured to reduce noise generated by the motor based on the target signal;

generate a q-axis current command configured to control the velocity of the motor based on the velocity of the motor detected by the velocity sensor and a velocity command;

generate a voltage command based on the d-axis current command of the motor and the q-axis current command of the motor; and output the generated voltage command to the inverter; and a body configured to, upon receiving vibration generated by the motor, transfer the received vibration to the indoor space in a form of radiation sound.

15. The vehicle of claim 14, wherein the motor control apparatus includes:

a basic signal generator configured to generate the plurality of reference signals;

an active noise canceller configured to:

filter each of the plurality of reference signals based on the error signal and the preset filter value' take a sum of the filtered reference signals to generate the target signal; and generate the d-axis current command based on the target signal; and a magnetic flux reference controller configured to perform phase-conversion on the d-axis current command and the q-axis current command and perform a pulse-width modulation on a signal obtained by the phase-conversion, to generate a three-phase voltage command.

16. The vehicle of claim 14, wherein the preset filter value includes a preset first filter value and a preset second filter value, and the motor control apparatus includes:

a first filter updater configured to filter a reference sine wave signal obtained from the plurality of reference signals based on the error signal and the preset first filter value;

a phase converter configured to convert a phase of the reference sine wave signal to generate a reference cosine wave signal;

a second filter updater configured to filter the reference cosine wave signal based on the error signal and the preset second filter value;

a summation generator configured to take a sum of the filtered reference sine wave signal and the filtered reference cosine wave signal;

a first secondary path model configured to filter the reference sine wave signal using a secondary path model;

a second secondary path model configured to filter the reference cosine wave signal using the secondary path model; and a least mean square (LMS) controller configured to update the first filter value of the first filter updater based on a signal obtained by filtering the reference sine wave signal in the first secondary path model and the error signal and update the second filter value of the second filter updater based on a signal obtained by filtering the reference cosine wave signal in the second secondary path model and the error signal.

17. The vehicle of claim 16, wherein the motor control apparatus includes:

a proportional integral controller configured to perform proportional integration on the d-axis current command and perform proportional integration on the q-axis current command;

a first phase converter configured to convert the d-axis current command and the q-axis current command, which are subjected to proportional integration by the proportional integral controller, to have three phases;

a pulse-width modulation controller configured to modulate a pulse-width of a signal, which is converted to have three phases by the first phase converter, to generate the voltage command; and a second phase converter configured to convert a three-phase current of the motor detected by a current sensor into a two-phase current and provide the proportional integral controller with the two-phase current as feedback.

* * * * *